US 12,286,767 B2

(12) United States Patent
Wu

(10) Patent No.: US 12,286,767 B2
(45) Date of Patent: Apr. 29, 2025

(54) SHOVEL

(71) Applicant: SUMITOMO HEAVY INDUSTRIES, LTD., Tokyo (JP)

(72) Inventor: Chunnan Wu, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 963 days.

(21) Appl. No.: 17/025,234

(22) Filed: Sep. 18, 2020

(65) Prior Publication Data

US 2021/0002859 A1   Jan. 7, 2021

Related U.S. Application Data

(63) Continuation of application No. PCT/JP2019/011248, filed on Mar. 18, 2019.

(30) Foreign Application Priority Data

Mar. 23, 2018   (JP) .................................. 2018-057173

(51) Int. Cl.
*E02F 3/43* (2006.01)
*E02F 9/12* (2006.01)
(Continued)

(52) U.S. Cl.
CPC .............. *E02F 9/123* (2013.01); *E02F 3/435* (2013.01); *E02F 9/2033* (2013.01); *E02F 9/24* (2013.01);
(Continued)

(58) Field of Classification Search
CPC ......... E02F 9/123; E02F 3/435; E02F 9/2033; E02F 9/24; E02F 9/2004; E02F 9/2228;
(Continued)

(56) References Cited

U.S. PATENT DOCUMENTS 9,454,147 B1 * 9/2016 Friend ..................... E02F 9/265
2010/0036645 A1 * 2/2010 McAree .................... B60T 7/22
703/1

(Continued)

FOREIGN PATENT DOCUMENTS

DE   102013212683   12/2014
EP      3760793     1/2021
(Continued)

OTHER PUBLICATIONS

Kageyama Masahito, Aug. 2, 2000, English Machine Translation_ JP2002047692A provided by Patent Translate by EPO and Google (Year: 2000).*

(Continued)

*Primary Examiner* — Ashley L Redhead, Jr.
(74) *Attorney, Agent, or Firm* — IPUSA, PLLC

(57) ABSTRACT

A shovel includes a lower-part traveling body; an upper-part swing body rotatably provided above the lower-part traveling body; an object detecting device provided in the upper-part swing body; a controller as a control device provided in the upper-part swing body; and at least one driven body configured to be operated by an actuator. The object detecting device is configured to detect another shovel in a detection space set around the shovel. The controller is configured to vary a movable range being a range accessible to the driven body, based on a state of an object detected by the object detecting device.

15 Claims, 16 Drawing Sheets

(51) Int. Cl.
*E02F 9/20* (2006.01)
*E02F 9/24* (2006.01)
*G08B 21/02* (2006.01)
*G08G 1/16* (2006.01)
*E02F 9/22* (2006.01)
*E02F 9/26* (2006.01)

(52) U.S. Cl.
CPC ............ *E02F 9/2004* (2013.01); *E02F 9/2228* (2013.01); *E02F 9/2285* (2013.01); *E02F 9/2292* (2013.01); *E02F 9/2296* (2013.01); *E02F 9/262* (2013.01); *G08B 21/02* (2013.01); *G08G 1/16* (2013.01)

(58) Field of Classification Search
CPC ..... E02F 9/2285; E02F 9/2292; E02F 9/2296; E02F 9/262; E02F 9/205; E02F 9/2235; E02F 9/2242; E02F 9/2282; E02F 9/265; E02F 9/261; E02F 9/2037; E02F 9/26; G08B 21/02; G08G 1/16; G08G 1/161; G08G 1/166; G08G 1/09; B60W 2300/17; B60W 2420/42
See application file for complete search history.

(56) References Cited

U.S. PATENT DOCUMENTS

| | | | | |
|---|---|---|---|---|
| 2013/0213920 | A1* | 8/2013 | Oliver | B60R 9/00 212/302 |
| 2017/0073935 | A1* | 3/2017 | Friend | E02F 9/265 |
| 2019/0155278 | A1 | 5/2019 | Idbrant et al. | |
| 2019/0287407 | A1* | 9/2019 | Branscombe | G08G 1/161 |
| 2021/0002852 | A1* | 1/2021 | Nishi | E02F 9/262 |
| 2021/0002859 | A1* | 1/2021 | Wu | G08G 1/161 |
| 2022/0275606 | A1* | 9/2022 | Yoshimoto | E02F 3/437 |

FOREIGN PATENT DOCUMENTS

| | | | | |
|---|---|---|---|---|
| JP | H05321304 | A * | 5/1992 | |
| JP | H05-321304 | | 12/1993 | |
| JP | H11-315557 | | 11/1999 | |
| JP | 2002-047692 | | 2/2002 | |
| JP | 2002047692 | A * | 2/2002 | |
| JP | 2010-198519 | | 9/2010 | |
| JP | 2010198519 | A * | 9/2010 | ............... E02F 9/24 |
| JP | 2013-205956 | | 10/2013 | |
| JP | 2015-63864 | | 4/2015 | |
| JP | 2016-045674 | | 4/2016 | |
| WO | 2017/184068 | | 10/2017 | |

OTHER PUBLICATIONS

Mori Hisanobu, May 26, 1992, English Machine Translation_ JPH05321304A provided by Patent Translate by EPO and Google (Year: 1992).*

Ishimoto Hidefumi, Feb. 27, 2009, English Machine Translation_ JP2010198519A provided by Patent Translate by EPO and Google (Year: 2009).*

International Search Report for PCT/JP2019/011248 mailed on Jun. 11, 2019.

* cited by examiner

US 12,286,767 B2

SHOVEL

RELATED APPLICATIONS

This present application is a continuation application of International Application No. PCT/JP2019/011248, filed Mar. 18, 2019, which claims priority to Japanese Patent Application No. 2018-057173, filed Mar. 23, 2018. The contents of these applications are incorporated herein by reference in their entirety.

BACKGROUND

1. Technical Field

The present disclosure relates to a shovel.

2. Description of Related Art

A shovel is known to decelerate or stop movement of an arm, upon determining that there is a possibility of interference (collision) with another shovel that operates nearby.

SUMMARY

According to an embodiment of the present disclosure, there is provided a shovel, the shovel including a lower-part traveling body; an upper-part swing body rotatably provided above the lower-part traveling body; an object detecting device provided in the upper-part swing body; a control device provided in the upper-part swing body; and at least one driven body configured to be operated by an actuator, wherein the object detecting device is configured to detect an object in a detection space set around the shovel, and wherein the control device is configured to vary a movable range being a range accessible to the driven body, based on a state of the object detected by the object detecting device.

DETAILED DESCRIPTION

The present inventor has recognized that a shovel may decelerate or stop the movement of the arm if there is any possibility of the collision. Thus, operational efficiency may be reduced.

In light of the point described above, it is desirable to provide a shovel that is capable of operating efficiently while avoiding collision with another object that operates nearby.

Figure 1A:
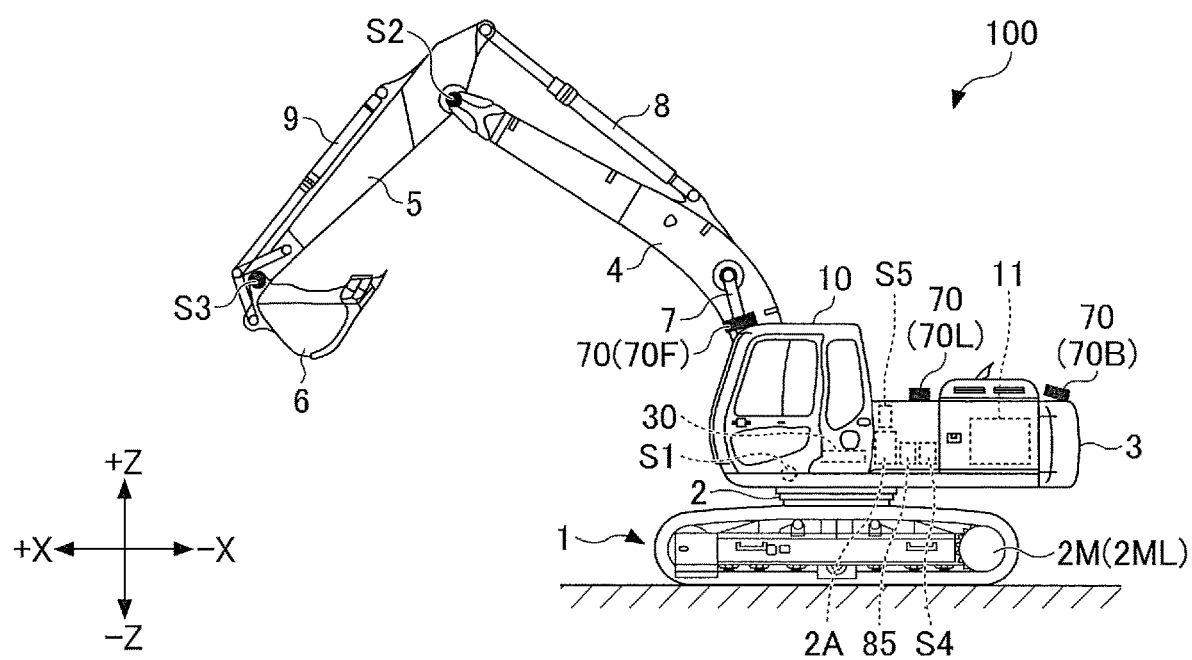
FIG. 1A is a side view of a shovel according to an embodiment of the present disclosure.
Figure 1B:
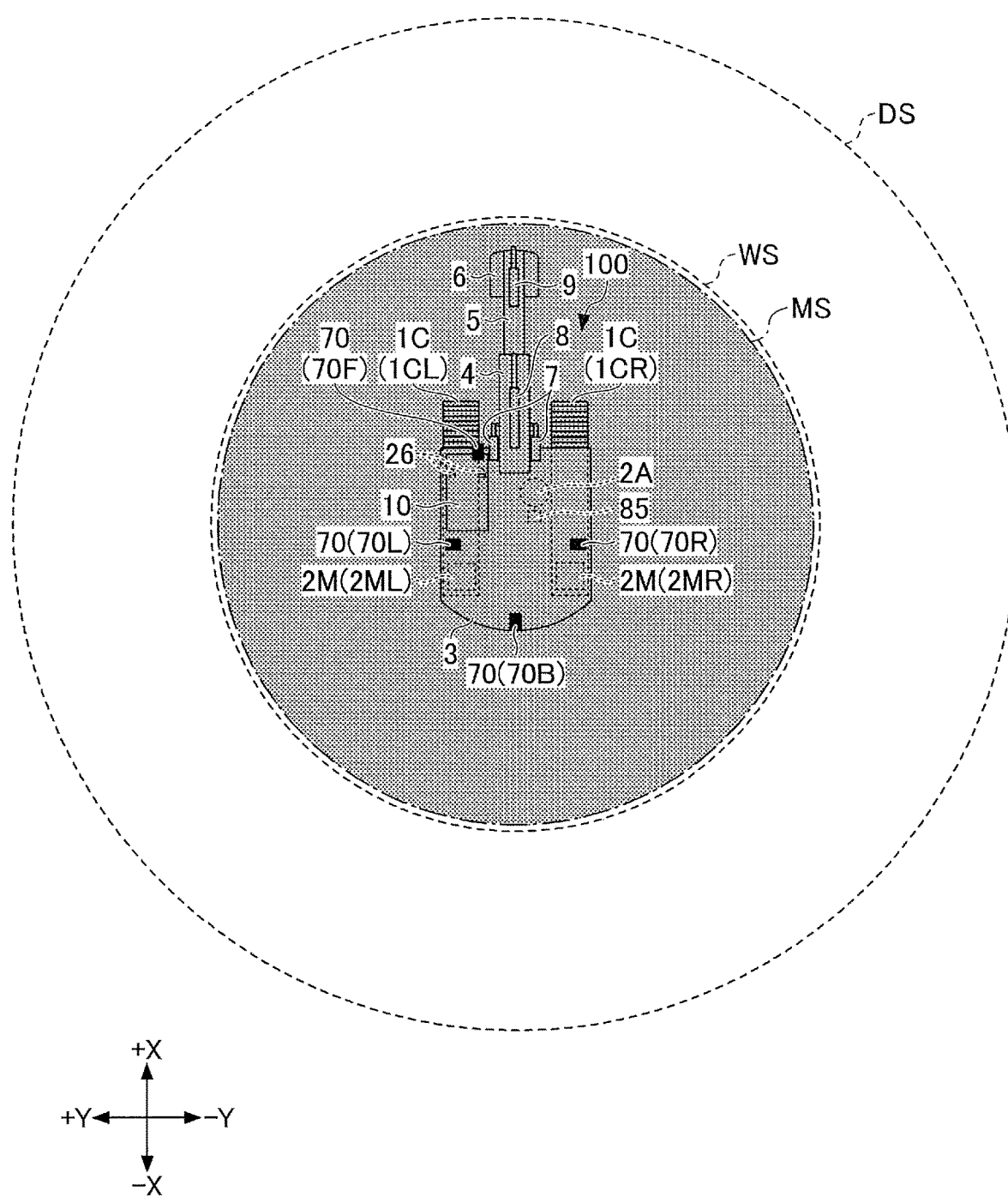
FIG. 1B is a top view of the shovel according to the embodiment of the present disclosure.

First, a shovel 100 as a digger according to the embodiment of the present disclosure will be described with reference to FIGS. 1A and 1B. FIGS. 1A and 1B are diagrams illustrating an example of the configuration of the shovel 100. FIG. 1A is a side view of the shovel, and FIG. 1B is a top view of the shovel.

In the present embodiment, a lower-part traveling body 1 of the shovel 100 includes crawlers 1C as driven bodies. The crawlers 1C are driven by a travel hydraulic motor 2M provided in the lower-part traveling body 1. However, the travel hydraulic motor 2M may be a motor generator for travel, as an electric actuator. Specifically, the crawlers 1C include a left crawler 1CL and a right crawler 1CR. The left crawler 1CL is driven by a left travel hydraulic motor 2ML, and the right crawler 1CR is driven by a right travel hydraulic motor 2MR. The lower-part traveling body 1 is driven by the crawlers 1C and serves as a driven body.

An upper-part swing body 3 is rotatably provided above the lower-part traveling body 1 via a swing mechanism 2. The swing mechanism 2 as a driven body is driven by a swing hydraulic motor 2A that is provided in the upper-part swing body 3. However, the swing hydraulic motor 2A may be a motor generator for a swing motion, as an electric actuator. The upper-part swing body 3 is driven by the swing mechanism 2 and serves as a driven body.

A boom 4 as a driven body is attached to the upper-part swing body 3. An arm 5 as a driven body is attached to a tip of the boom 4, and a bucket 6 as a driven body and an end attachment is attached to a tip of the arm 5. The boom 4, the arm 5, and the bucket 6 constitute a digging attachment, which is an example of an attachment. The boom 4 is driven by a boom cylinder 7, the arm 5 is driven by an arm cylinder 8, and the bucket 6 is driven by a bucket cylinder 9. The digging attachment is driven by the boom cylinder 7, the arm cylinder 8, and the bucket cylinder 9, and serves as a driven body.

A boom angle sensor S1 is attached to the boom 4, an arm angle sensor S2 is attached to the arm 5, and a bucket angle sensor S3 is attached to the bucket 6.

The boom angle sensor S1 is configured to detect a rotation angle of the boom 4. In the present embodiment, the boom angle sensor S1 is an acceleration sensor and can detect a boom angle that is the rotation angle of the boom 4 with respect to the upper-part swing body 3. For example, the boom angle is set to a minimum angle when the boom 4 is lowered all the way. The boom angle increases as the boom 4 is raised.

The arm angle sensor S2 is configured to detect a rotation angle of the arm 5. In the present embodiment, the arm angle sensor S2 is an acceleration sensor and can detect an arm angle that is the rotation angle of the arm 5 with respect to the boom 4. For example, the arm angle is set to a minimum angle when the arm 5 is closed all the way. The arm angle increases as the arm 5 is opened.

The bucket angle sensor S3 is configured to detect a rotation angle of the bucket 6. In the present embodiment, the bucket angle sensor S3 is an acceleration sensor and can detect a bucket angle that is the rotation angle of the bucket 6 with respect to the arm 5. For example, the bucket angle is set to a minimum angle when the bucket 6 is closed all the way. The bucket angle increases as the bucket 6 is opened.

Each of the boom angle sensor S1, the arm angle sensor S2, and the bucket angle sensor S3 may include a potentiometer using a variable resistor; a stroke sensor that detects a stroke amount of a corresponding hydraulic cylinder; a rotary encoder that detects a rotation angle about a coupling pin; a gyro sensor; a combination of an acceleration sensor and a gyro sensor; or the like.

The upper-part swing body 3 is provided with a cab 10 as an operator's compartment, and a power source such as an engine 11 is mounted on the upper-part swing body 3. A controller 30; an object detecting device 70; an orientation detecting device 85; a main machine tilt sensor S4; a turn angular velocity sensor S5; and the like, are attached to the upper-part swing body 3. Inside the cab 10, operating devices 26 and the like are provided. Note that in this description, for the sake of convenience, the side of the upper-part swing body 3 where the boom 4 is attached is referred to as the front, and the side of the upper-part swing body 3 where a counterweight is attached is referred to as the rear.

The controller 30 is a control device that controls the shovel 100. In the present embodiment, the controller 30 includes a computer including a CPU, a RAM, a NVRAM, a ROM, and the like. The controller 30 retrieves, from the ROM, a program corresponding to each function; loads the program to the RAM; and causes the CPU to execute a corresponding process.

The object detecting device 70 is configured to detect an object present in the surroundings of the shovel 100. The object detecting device 70 is configured to calculate a distance from the object detecting device 70 or the shovel 100, to a detected object. The object includes, for example, a person, an animal, a vehicle, a construction machine, a building, a fence, a hole, or the like. The object detecting device 70 includes, for example, a monocular camera, an ultrasonic sensor, a milliwave radar, a laser radar, a stereo camera, a LIDAR, a distance image sensor, an infrared sensor, or the like. In the present embodiment, the object detecting device 70 includes a plurality of distance image sensors. The object detecting device 70 includes a front sensor 70F attached to a front end of the upper surface of the cab 10; a rear sensor 70B attached to a rear end of the upper surface of the upper-part swing body 3; a left sensor 70L attached to a left end of the upper surface of the upper-part swing body 3; and a right sensor 70R attached to a right end of the upper surface of the upper-part swing body 3.

The controller 30 may be configured to be able to detect a predetermined object in a predetermined area that is set in the surroundings of the shovel 100, based on the output of the object detecting device 70. The predetermined object includes a movable body such as another shovel. Specifically, the controller 30 may be configured to be able to distinguish between an object other than the shovel, such as a stationary object including a fence or the like, and the shovel. In this case, the controller 30 recognizes the shovel as a movable body that allows a predetermined motion, and can easily estimate a motion trajectory of the shovel accordingly. The predetermined motion includes, for example, revolving of the upper-part swing body 3 about a pivot; rotation of the boom 4 about a rotation axis of the boom; forward travel and backward travel of the crawlers 1C in an extension direction of the crawlers; or the like.

The orientation detecting device 85 is configured to detect information (hereinafter referred to as "orientation information") about a relative relationship between the orientation of the upper-part swing body 3 and the orientation of the lower-part traveling body 1. For example, the orientation detecting device 85 may include a combination of a geomagnetic sensor attached to the lower-part traveling body 1 and a geomagnetic sensor attached to the upper-part swing body 3. Alternatively, the orientation detecting device 85 may include a combination of a GNSS receiver attached to the lower-part traveling body 1 and a GNSS receiver attached to the upper-part swing body 3. In a configuration in which the upper-part swing body 3 is driven to be swung by a motor generator for a swing motion, the orientation detecting device 85 may include a resolver.

The main machine tilt sensor S4 is configured to detect a tilt of the upper-part swing body 3 with respect to a predetermined plane. In the present embodiment, the main machine tilt sensor S4 is an acceleration sensor that detects, with respect to a horizontal plane, a tilt angle (roll angle) about a front-rear axis of the upper-part swing body 3 and that detects a tilt angle (pitch angle) about a right-left axis of the upper-part swing body. For example, the front-rear axis and the left-right axis of the upper-part swing body 3 are perpendicular to each other, and pass through a center point of the shovel, which is a point on the pivot of the shovel 100. The main machine tilt sensor S4 may include a combination of an acceleration sensor and a gyro sensor.

The turn angular velocity sensor S5 is configured to detect a turn angular velocity of the upper-part swing body 3. In the present embodiment, the turn angular velocity sensor S5 is a gyro sensor. The turn angular velocity sensor S5 may include a resolver, a rotary encoder, or the like. The turn angular velocity sensor S5 may detect a turn rate. The turn rate may be calculated based on the turn angular velocity.

In the following, any combination of the boom angle sensor S1; the arm angle sensor S2; the bucket angle sensor S3; the main machine tilt sensor S4; and the turn angular velocity sensor S5, is collectively referred to as pose sensors. Each pose sensor is configured to acquire information about a pose of the shovel 100.

Figure 2:
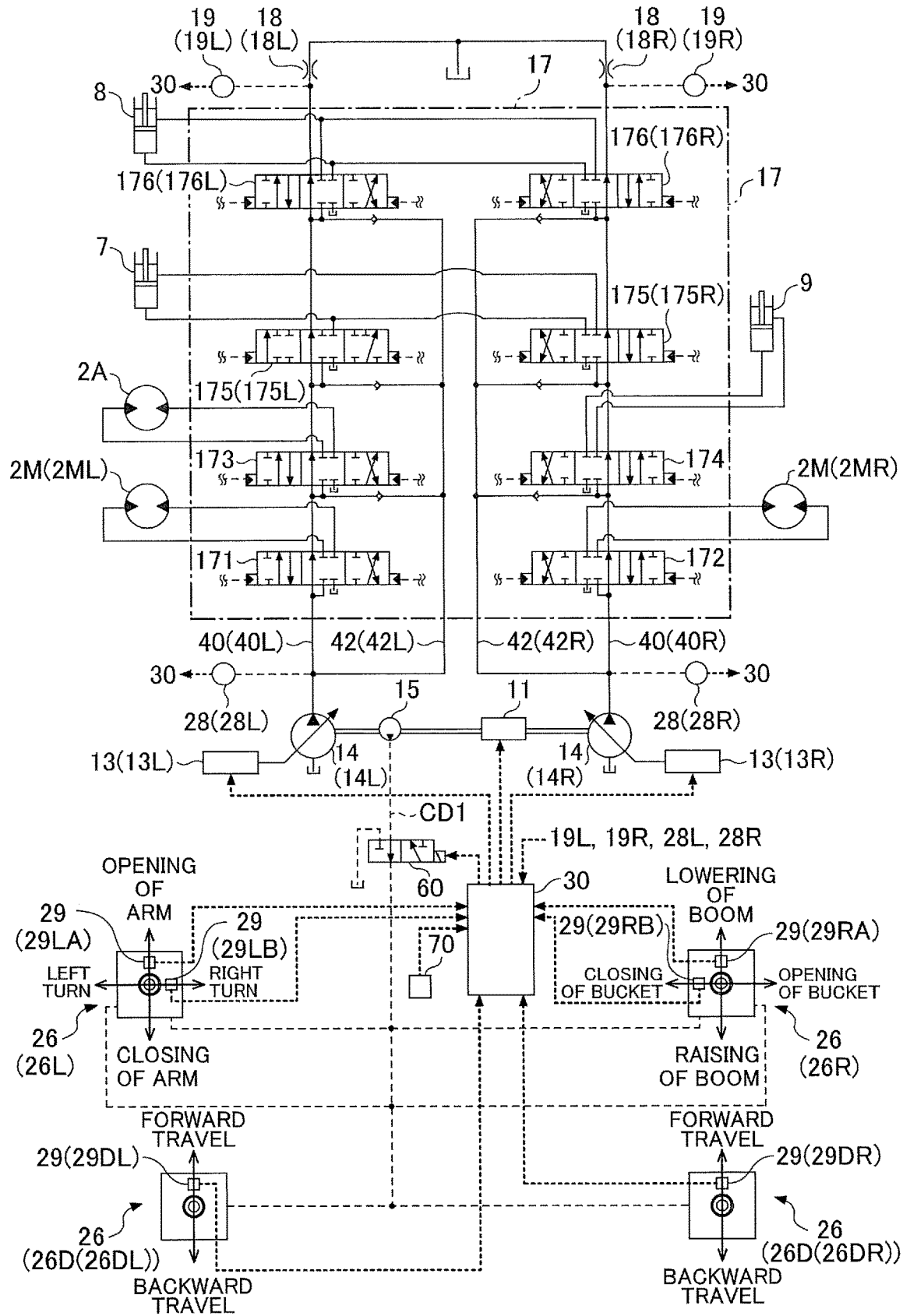
FIG. 2 is a diagram illustrating an example of the configuration of a hydraulic system provided in the shovel.

Hereafter, an example of the configuration of a hydraulic system provided in the shovel 100 will be described with reference to FIG. 2. FIG. 2 is a diagram illustrating an example of the configuration of the hydraulic system provided in the shovel 100. In FIG. 2, a mechanical power transmission line, a hydraulic oil line, a pilot line, and an electric control line are respectively represented by a double line, a solid line, a dashed line, and a dotted line.

The hydraulic system of the shovel 100 mainly includes an engine 11; regulators 13; main pumps 14; a pilot pump 15; a control valve 17; and the operating devices 26. The hydraulic system mainly includes discharge pressure sensors 28; operating pressure sensors 29; the controller 30; a control valve 60; and the like.

In FIG. 2, in the hydraulic system, hydraulic oil is circulated from each of the main pumps 14 that is driven by the engine 11, to a hydraulic oil tank, via a given center bypass pipe line 40 or a given parallel pipe line 42.

The engine 11 is a drive source of the shovel 100. In the present embodiment, the engine 11 is, for example, a diesel engine that operates to maintain a predetermined rotation speed. An output shaft of the engine 11 is coupled with an input shaft of each of the main pumps 14 and the pilot pump 15.

Each main pump 14 is configured to supply the hydraulic oil to the control valve 17 via a given hydraulic oil line. In the present embodiment, each main pump 14 is a swashplate variable displacement hydraulic pump.

Each regulator 13 is configured to control a discharge rate (displacement) of the main pump 14. In the present embodiment, each regulator 13 adjusts an inclination angle of the swashplate in a given main pump 14, in accordance with a control command from the controller 30, to thereby control the discharge rate (displacement) of the main pump 14.

The pilot pump 15 is configured to supply the hydraulic oil to hydraulic control devices including the operating devices 26, via the pilot lines. In the present embodiment, the pilot pump 15 is a fixed displacement hydraulic pump. However, the pilot pump 15 may not be provided. In this case, the function implemented by the pilot pump 15 may be implemented by the main pumps 14. In other words, each main pump 14 may include a function of supplying, after decreasing pressure of the hydraulic oil by a restriction or the like, the hydraulic oil to a given operating device 26 or the like, as well as including a function of supplying the hydraulic oil to the control valve 17.

The control valve 17 is a hydraulic control device that controls the hydraulic system in the shovel 100. In the present embodiment, the control valve 17 includes control valves 171 to 176. The control valves 175 include a control valve 175L and a control valve 175R. The control valves 176 include a control valve 176L and a control valve 175R. The control valve 17 can selectively supply the hydraulic oil that is discharged by each main pump 14, to one or more hydraulic actuators, via one or more given valves from among the control valves 171 to 176. Each of the control valves 171 to 176 controls the flow rate of the hydraulic oil that flows from a given main pump 14 to a given hydraulic actuator, as well as the flow rate of the hydraulic oil that flows from a given hydraulic actuator to the hydraulic oil tank. The hydraulic actuators include the boom cylinder 7; the arm cylinder 8; the bucket cylinder 9; the left travel hydraulic motor 2ML; the right travel hydraulic motor 2MR; and the swing hydraulic motor 2A.

The operating devices 26 are devices used by an operator to operate the actuators. The actuators include at least one from among a hydraulic actuator and an electric actuator. In the present embodiment, each operating device 26 supplies the hydraulic oil that the pilot pump 15 discharges, to a pilot port of a corresponding control valve in the control valve 17, via the pilot line. The pressure (pilot pressure) of the hydraulic oil that is supplied to each of the pilot ports, is pressure in accordance with an operation direction and an operation amount of a lever or a pedal (not illustrated) of the operating device 26 that corresponds to a given hydraulic actuator.

Each discharge pressure sensor 28 is configured to detect discharge pressure of the main pump 14. In the present embodiment, each discharge pressure sensor 28 outputs a detected value to the controller 30.

Each operating pressure sensor 29 is configured to detect the operational content for the operating device 26, through the operator. In the present embodiment, each operating pressure sensor 29 detects, as pressure (operating pressure), the operation direction and the operation amount of the lever or the pedal of the operating device 26 that corresponds to a given actuator. Each operating pressure sensor 29 outputs a detected value to the controller 30. The operational content for each operating device 26 may be detected using another sensor, other than the operating pressure sensor.

The main pumps 14 include a left main pump 14L and a right main pump 14R. The left main pump 14L circulates the hydraulic oil to the hydraulic oil tank, via a left center bypass pipe line 40L or a left parallel pipe line 42L. The right main pump 14R circulates the hydraulic oil to the hydraulic oil tank, via a right center bypass pipe line 40R or a right parallel pipe line 42R.

The left center bypass pipe line 40L is a hydraulic oil line through the control valves 171, 173, 175L, and 176L that are disposed in the control valve 17. The right center bypass pipe line 40R is a hydraulic oil line through the control valves 172, 174, 175R, and 176R that are disposed in the control valve 17.

The control valve 171 is a spool valve that supplies the hydraulic oil discharged by the left main pump 14L, to the left travel hydraulic motor 2ML, and that switches hydraulic oil flows in order to discharge the hydraulic oil discharged by the left travel hydraulic motor 2ML, into the hydraulic oil tank.

The control valve 172 is a spool valve that supplies the hydraulic oil discharged by the right main pump 14R, to the right travel hydraulic motor 2MR, and that switches hydraulic oil flows in order to discharge the hydraulic oil discharged by the right travel hydraulic motor 2MR, into the hydraulic oil tank.

The control valve 173 is a spool valve that supplies the hydraulic oil discharged by the left main pump 14L, to the swing hydraulic motor 2A, and that switches hydraulic oil flows in order to discharge the hydraulic oil discharged by the swing hydraulic motor 2A, into the hydraulic oil tank.

The control valve 174 is a spool valve that supplies the hydraulic oil discharged by the right main pump 14R, to the bucket cylinder 9, and that switches hydraulic oil flows in order to discharge the hydraulic oil in the bucket cylinder 9 into the hydraulic oil tank.

The control valve 175L is a spool valve that switches hydraulic oil flows, in order to supply the hydraulic oil discharged by the left main pump 14L, to the boom cylinder 7. The control valve 175R is a spool valve that supplies the hydraulic oil discharged by the right main pump 14R, to the boom cylinder 7, and that switches hydraulic oil flows in order to discharge the hydraulic oil in the boom cylinder 7 into the hydraulic oil tank.

The control valve 176L is a spool valve that supplies the hydraulic oil discharged by the left main pump 14L, to the arm cylinder 8, and that switches hydraulic oil flows in order to discharge the hydraulic oil in the arm cylinder 8 into the hydraulic oil tank.

The control valve 176R is a spool valve that supplies the hydraulic oil discharged by the right main pump 14R, to the arm cylinder 8, and that switches hydraulic oil flows in order to discharge the hydraulic oil in the arm cylinder 8 into the hydraulic oil tank.

The left parallel pipe line 42L is a hydraulic oil line parallel to the left center bypass pipe line 40L. The left parallel pipe line 42L can supply the hydraulic oil to a further downstream control valve, when the hydraulic oil flow through the left center bypass pipe line 40L is restricted or shut off by any of the control valves 171, 173, and 175L. The right parallel pipe line 42R is a hydraulic oil line parallel to the right center bypass pipe line 40R. The right parallel pipe line 42R can supply the hydraulic oil to a further downstream control valve, when the hydraulic oil flow through the right center bypass pipe line 40R is restricted or shut off by any of the control valves 172, 174, and 175R.

The regulators 13 include a left regulator 13L and a right regulator 13R. The left regulator 13L adjusts an inclination angle of the swashplate of the left main pump 14L in accordance with the discharge pressure of the left main pump 14L, to thereby control the discharge rate of the left main pump 14L. Specifically, the left regulator 13L adjusts the inclination angle of the swashplate of the left main pump 14L in accordance with an increase in the discharge pressure of the left main pump 14L, to thereby reduce the discharge rate. The right regulator 13R has the same configuration as the left regulator 13L. In such a configuration, absorption power (e.g., absorption horsepower) of the main pump 14 that is expressed by a product of discharge pressure and a discharge rate, does not exceed the output power (e.g., output horsepower) of the engine 11.

The operating devices 26 include a left control lever 26L, a right control lever 26R, and travel levers 26D. The travel levers 26D include a left travel lever 26DL and a right travel lever 26DR.

The left control lever 26L is used for a swing operation and an operation of the arm 5. When the left control lever 26L is operated in a front-back direction of the lever, the left control lever 26L utilizes the hydraulic oil discharged by the pilot pump 15 to apply control pressure in accordance with an operation amount of the lever, to the pilot port of the control valve 176. When the left control lever 26L is operated in a left-right direction of the lever, the left control lever 26L utilizes the hydraulic oil discharged by the pilot pump 15 to apply control pressure in accordance with an operation amount of the lever, to the pilot port of the control valve 173.

Specifically, when the left control lever 26L is operated in a direction in which the arm is closed, the left control lever 26L causes the hydraulic oil to be supplied to a right pilot port of the control valve 176L, and causes the hydraulic oil to be supplied to a left pilot port of the control valve 176R. When the left control lever 26L is operated in a direction in which the arm is opened, the left control lever 26L causes the hydraulic oil to be supplied to a left pilot port of the control valve 176L, and causes the hydraulic oil to be supplied to a right pilot port of the control valve 176R. Further, when the left control lever 26L is operated in a left turn direction, the left control lever 26L causes the hydraulic oil to be supplied to a left pilot port of the control valve 173. When the left control lever 26L is operated in a right turn direction, the left control lever 26L causes the hydraulic oil to be supplied to a right pilot port of the control valve 173.

The right control lever 26R is used for an operation of the boom 4 and an operation of the bucket 6. When the right control lever 26R is operated in a front-back direction of the lever, the right control lever 26R utilizes the hydraulic oil discharged by the pilot pump 15 to apply control pressure in accordance with an operation amount of the lever, to the pilot port of the control valve 175. When the right control lever 26R is operated in a left-right direction of the lever, the right control lever 26R utilizes the hydraulic oil discharged by the pilot pump 15 to apply control pressure in accordance with an operation amount of the lever, to the pilot port of the control valve 174.

Specifically, when the right control lever 26R is operated in a direction in which the boom is lowered, the right control lever 26R causes the hydraulic oil to be supplied to a left pilot port of the control valve 175R. When the right control lever 26R is operated in a direction in which the boom is raised, the right control lever 26R causes the hydraulic oil to be supplied to a right pilot port of the control valve 175L, and causes the hydraulic oil to be supplied to a left pilot port of the control valve 175R. Further, when the right control lever 26R is operated in a direction in which the bucket is closed, the right control lever 26R causes the hydraulic oil to be supplied to a left pilot port of the control valve 174. When the right control lever 26R is operated in a direction in which the bucket is opened, the right control lever 26R causes the hydraulic oil to be supplied to a right pilot port of the control valve 174.

The travel levers 26D are used to operate the crawlers 1C. Specifically, the left travel lever 26DL is used to operate the left crawler 1CL. The left travel lever 26DL may be configured to interlock with a left travel pedal. When the left travel lever 26DL is operated in a front-back direction of the lever, the left travel lever 26DL utilizes the hydraulic oil discharged by the pilot pump 15 to apply control pressure in accordance with an operation amount of the lever, to the pilot port of the control valve 171. The right travel lever 26DR is used to operate the right crawler 1CR. The right travel lever 26DR may be configured to interlock with a right travel pedal. When the right travel lever 26DR is operated in a front-back direction of the lever, the right travel lever 26DR utilizes the hydraulic oil discharged by the pilot pump 15 to apply control pressure in accordance with an operation amount of the lever, to the pilot port of the control valve 172.

The discharge pressure sensors 28 include a discharge pressure sensor 28L and a discharge pressure sensor 28R. The discharge pressure sensor 28L detects the discharge pressure of the left main pump 14L, and outputs a detected value to the controller 30. The discharge pressure sensor 28R has the same configuration as the discharge pressure sensor 28L.

The operating pressure sensors 29 include operating pressure sensors 29LA, 29LB, 29RA, 29RB, 29DL, and 29DR. The operating pressure sensor 29LA detects, as pressure, the operational content for the left control lever 26L in a front-back direction of the lever, through the operator and outputs a detected value to the controller 30. The operational content includes, for example, an operation direction of the lever, an operation amount (an angle at which the lever is operated) of the lever, and the like.

Similarly, the operating pressure sensor 29LB detects, as pressure, the operational content for the left control lever 26L in a left-right direction of the lever, through the operator and outputs a detected value to the controller 30. The operating pressure sensor 29RA detects, as pressure, the operational content for the right control lever 26R in a front-back direction of the lever, through the operator and outputs a detected value to the controller 30. The operating pressure sensor 29RB detects, as pressure, the operational content for the right control lever 26R in a left-right direction of the lever, through the operator and outputs a detected value to the controller 30. The operating pressure sensor 29DL detects, as pressure, the operational content for the left travel lever 26DL in a front-back direction of the lever, through the operator and outputs a detected value to the controller 30. The operating pressure sensor 29DR detects, as pressure, the operational content for the right travel lever 26DR in a front-back direction of the lever, through the operator and outputs a detected value to the controller 30.

The controller 30 receives the output of each operating pressure sensor 29, and outputs a control command to a given regulator 13 as necessary to vary the discharge rate of a given main pump 14.

Hereafter, a negative control will be described using restrictions 18 and control pressure sensors 19. The restrictions 18 include a left restriction 18L and a right restriction 18R. The control pressure sensors 19 include a left control pressure sensor 19L and a right control pressure sensor 19R.

For the left center bypass pipe line 40L, the left restriction 18L is disposed between the control valve 176L situated last in the sequence of control valves, and the hydraulic oil tank. In this case, the flow of the hydraulic oil that is discharged by the left main pump 14L is restricted by the left restriction 18L. Further, the left restriction 18L produces control pressure for controlling the left regulator 13L. The left control pressure sensor 19L is a sensor that detects the above control pressure, and outputs a detected value to the controller 30. The controller 30 adjusts the inclination angle of the swashplate of the left main pump 14L in accordance with the detected control pressure to thereby control the discharge rate of the left main pump 14L. The controller 30 decreases the discharge rate of the left main pump 14L as the control pressure increases. The controller 30 increases the discharge rate of the left main pump 14L as the control pressure decreases. The discharge rate of the right main pump 14R is controlled as is the case with the discharge rate of the left main pump 14L.

Specifically, as illustrated in FIG. 2, in a standby state in which none of the hydraulic actuators in the shovel 100 is operated, the hydraulic oil discharged by the left main pump 14L passes through the left center bypass pipe line 40L, and reaches the left restriction 18L. The flow of the hydraulic oil discharged by the left main pump 14L increases the control pressure produced upstream of the left restriction 18L. As a result, the controller 30 reduces the discharge rate of the left main pump 14L to an allowable minimum discharge rate, and minimizes the pressure loss (pumping loss) when the discharged hydraulic oil passes through the left center bypass pipe line 40L. In contrast, when any hydraulic actuator corresponding to the left center bypass pipe line 40L is operated, the hydraulic oil discharged by the left main pump 14L flows into a given hydraulic actuator as an operation target, via a given control valve corresponding to the hydraulic actuator as the operation target. Further, the flow of the hydraulic oil discharged by the left main pump 14L causes an amount reaching the left restriction 18L to decrease or disappear to thereby reduce the control pressure produced upstream of the left restriction 18L. As a result, the controller 30 increases the discharge rate of the left main pump 14L to allow sufficient hydraulic oil to flow into the hydraulic actuator as the operation target. Accordingly, the hydraulic actuator as the operation target is reliably driven. Note that the controller 30 also controls the discharge rate of the right main pump 14R, as is the case with the discharge rate of the left main pump 14L.

In the configuration described above, the hydraulic system in FIG. 2 can reduce wasteful energy consumption for the main pumps 14, in the standby state. The wasteful energy consumption includes pumping loss occurring in the center bypass pipe lines 40, caused by the hydraulic oil that the main pumps 14 discharge. Further, in the hydraulic system in FIG. 2, when a given hydraulic actuator is operated, necessary and sufficient hydraulic fluid can be supplied to the hydraulic actuator as an operation target, by a given main pump 14.

The control valve 60 is configured to switch between an active state and an inactive state of each operating device 26. The active state of the operating device 26 is a state in which a related driven body can be moved when the operator operates a given operating device 26. The inactive state of the operating device 26 is a state in which a related driven body cannot be moved even when the operator operates a given operating device 26.

In the present embodiment, the control valve 60 is a solenoid valve capable of switching between a communication state and a shut-off state of the pilot line CD1, which couples the pilot pump 15 with each of the operating devices 26. Specifically, the control valve 60 is configured to switch between the communication state and the shut-off state of the pilot line CD1, in accordance with a command from the controller 30.

The control valve 60 may be configured to interlock with a gate lock lever not illustrated. Specifically, the pilot line CD1 may be configured such that, when the gate lock lever is pushed down, the pilot line CD1 changes to the shut-off state, and such that, when the gate lock lever is pulled up, the pilot line CD1 changes to the communication state.

Note that in the above embodiments, the hydraulic control lever with a hydraulic pilot circuit is adopted. However, instead of the hydraulic control lever with such a hydraulic pilot circuit, an electric control lever with an electric pilot circuit may be adopted. In this case, an operation amount of the lever being the electric control lever is input to the controller 30, as an electrical signal. Further, a solenoid valve is disposed between the pilot pump 15 and the pilot port of each of the control valves. Each solenoid valve is configured to operate in accordance with an electrical signal from the controller 30. In such a configuration, when a manual operation is performed using the electric control lever, the controller 30 controls a given solenoid valve in accordance with an electrical signal corresponding to the operation amount of the lever, and can increase or decrease pilot pressure to thereby cause a given control valve to operate. Note that each control valve may include a solenoid spool valve. In this case, the solenoid spool valve operates in accordance with an electrical signal from the controller 30, the electrical signal corresponding to the operation amount of the lever that is a given electric control lever.

Figure 3:
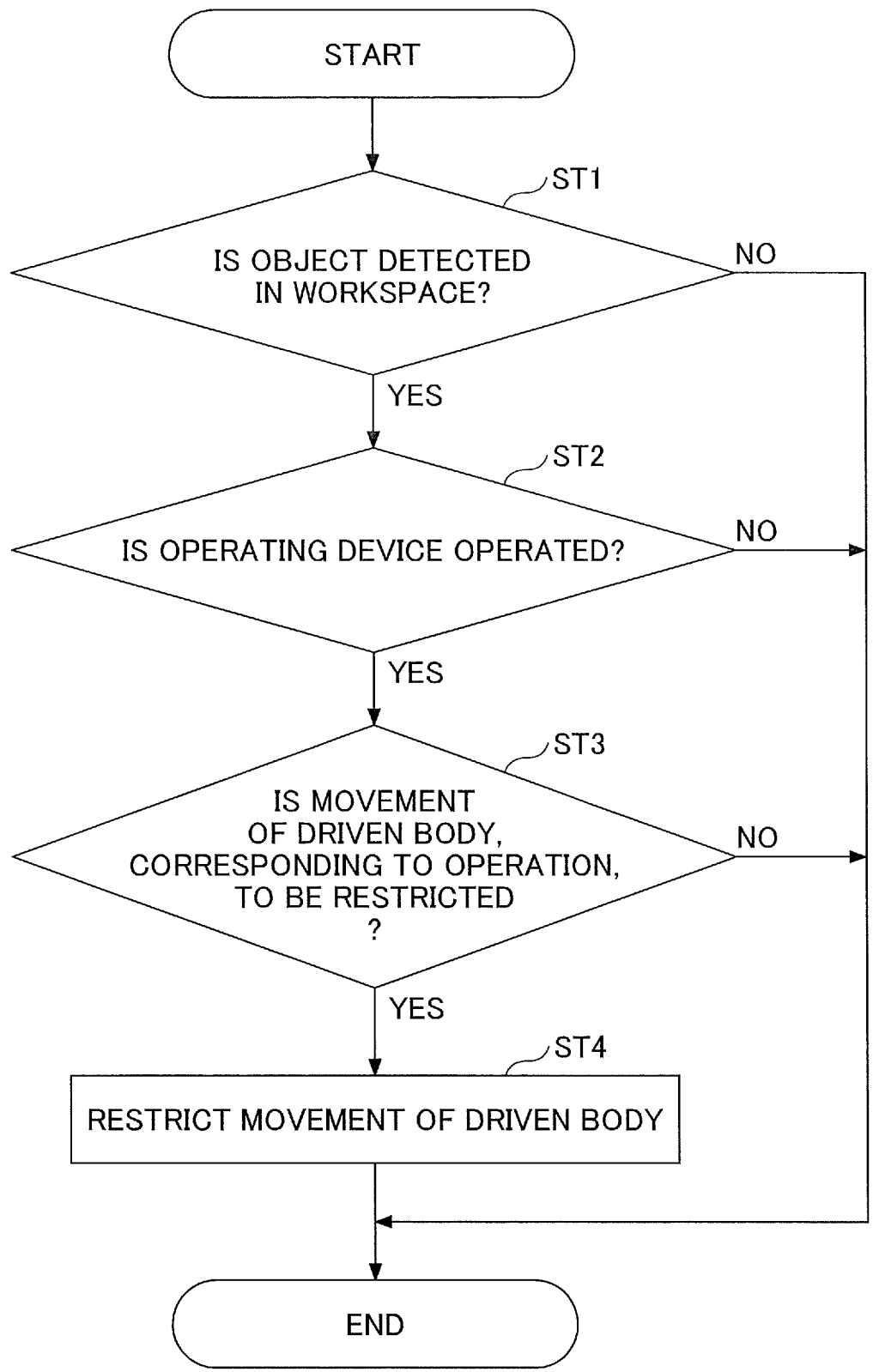
FIG. 3 is a flowchart illustrating an example of a movement restricting process.

Hereafter, a process (hereinafter referred to as a "movement restricting process") of restricting movement of a given driven body, by the controller 30, will be described with reference to FIG. 3. FIG. 3 is a flowchart illustrating an example of the movement restricting process. For example, the controller 30 repeatedly performs the movement restricting process in a predetermined control period.

First, the controller 30 determines whether an object is detected in a workspace WS as illustrated in FIG. 1B (step ST1). In the present embodiment, the controller 30 determines whether the object is detected in the workspace WS included in a detection space DS as illustrated in FIG. 1B, based on the output of the object detecting device 70. The object is, for example, another shovel. The object may be another machine, such as a dump truck.

The detection space DS is a space set in the surroundings of the shovel 100. In the present embodiment, the detection space DS is a cylindrical space having a radius that is a distance greater than a maximum swing radius of the shovel 100. For example, the maximum swing radius is a distance between the pivot, which is set when the digging attachment is stretched outward to the maximum extent, and a tip of the bucket 6. The object detecting device 70 is configured to be able to detect an object present in the detection space DS.

The workspace WS is a space set in the detection space DS, as a space where the shovel 100 can operate. In the present embodiment, the workspace WS corresponds to a range derived from a motion trajectory of the shovel 100. Specifically, the workspace WS is a cylindrical space of which the radius is the maximum swing radius.

If it is determined that an object is not detected in the workspace WS (NO in step ST1), the controller 30 terminates the current movement restricting process.

If it is determined that an object is detected in the workspace WS (YES in step ST1), the controller 30 determines whether the operating device 26 is operated (step ST2). In the present embodiment, the controller 30 determines whether the operating device 26 is operated based on the output of the operating pressure sensors 29. For example, the controller 30 determines, based on the output of the operating pressure sensor 29LA, whether an operation of the arm being closed is performed and whether an operation of the arm being opened is performed, as well as determining, based on the output of the operating pressure sensor 29LB, whether a left turn operation is performed and whether a right turn operation is performed. Alternatively, the controller 30 determines, based on the output of the operating pressure sensor 29RA, whether an operation of the boom being raised is performed and whether an operation of the boom being lowered is performed, as well as determining, based on the output of the operating pressure sensor 29RB, whether an operation of the bucket being closed is performed and whether an operation of the bucket being opened is performed. Similarly, the controller 30 determines, based on the output of the operating pressure sensor 29DL, whether a forward travel operation of the left crawler 1CL is performed and whether a backward travel operation of the left crawler 1CL is performed, as well as determining, based on the output of the operating pressure sensor 29DR, whether a forward travel operation of the right crawler 1CR is performed and whether a backward travel operation of the right crawler 1CR is performed.

When it is determined that the operating device 26 is not operated (No in step ST2), the controller 30 terminates the current movement restricting process.

If it is determined that the operating device 26 is operated (YES in step ST2), the controller 30 determines whether to restrict movement of the driven body, corresponding to the operation (step ST3). The restriction on the movement of the driven body may include prohibiting of the movement of the driven body. In other words, the controller 30 determines whether to allow the movement of the driven body, corresponding to a manual operation via the operating device 26. In the present embodiment, the controller 30 acquires information about the pose of the shovel 100, based on the output of the pose sensors. The controller 30 determines whether the movement of the driven body is movement in a movable range MS as illustrated in FIG. 1B, based on the acquired information. In FIG. 1B, the movable range MS is expressed by dot hatching.

The movable range MS is a range where the driven body can enter, the range being set variably in the workspace WS. In the present embodiment, the movable range MS is variably set based on a given object in the detection space DS; or a state of a given object in the workspace WS included in the detection space DS.

Figure 4:
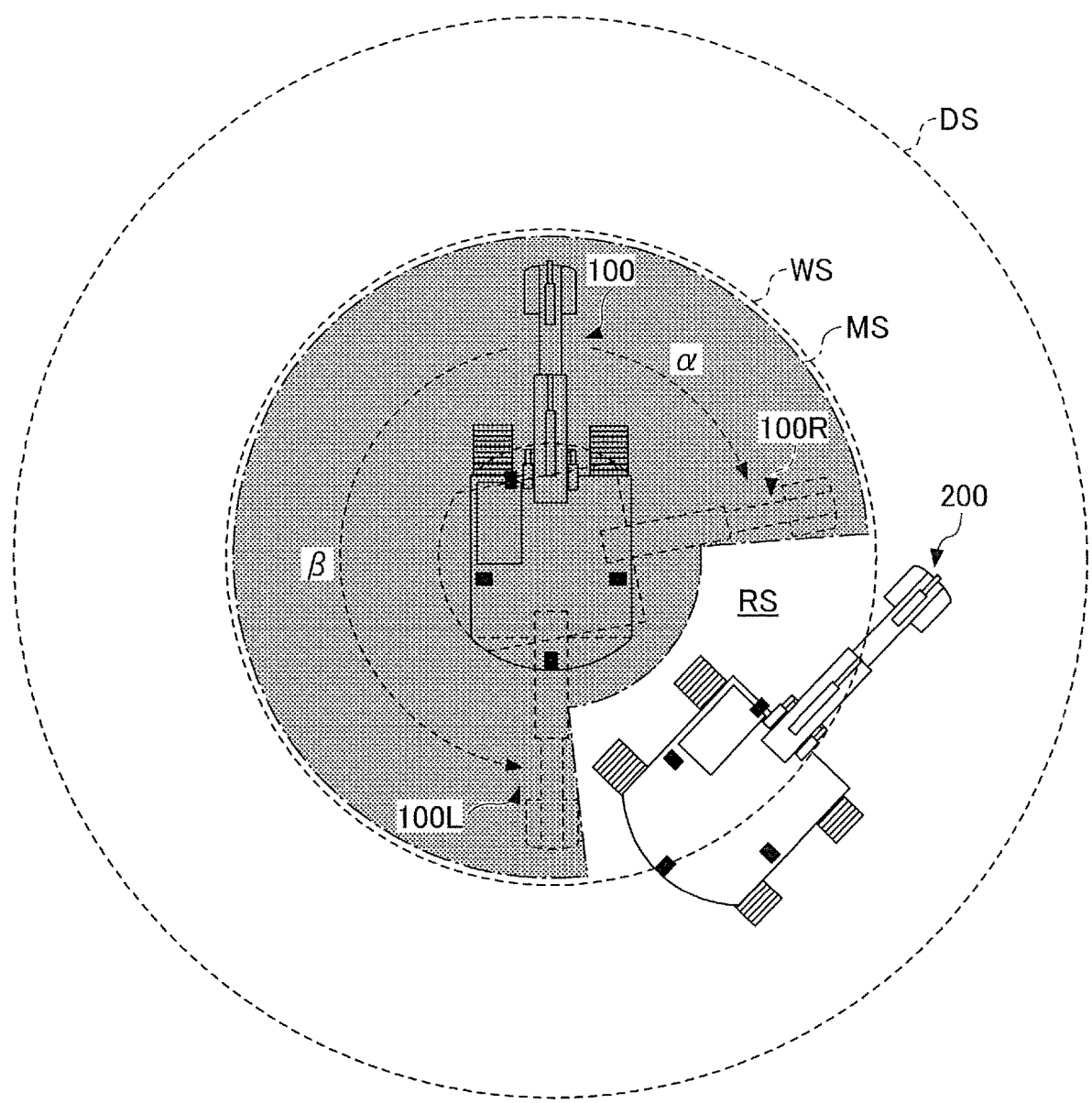
FIG. 4 is a top view of the shovel where an example of setting a movable range and a restricted range is illustrated.

A range other than the movable range MS, in the workspace WS is a restricted range RS (see FIG. 4). The restricted range RS is a range where entry of the driven body is restricted. In FIG. 1B, because the whole workspace WS is the movable range MS, there is no restricted range RS.

The controller 30 is configured to variably set the movable range MS, based on, for example, the state of the object in the detection space DS. In the present embodiment, the controller 30 variably sets the movable range MS based on a current state or a future state of a given object detected by the object detecting device 70. The future state is a state after a predetermined period has elapsed from the present time point, and is estimated based on at least one of a past state and the current state. Typically, the controller 30 variably sets the movable range MS such that, when the object being detected by the object detecting device 70 moves closer to the shovel 100, the movable range MS decreases. Further, the controller 30 variably sets the movable range MS such that, when the object being detected by the object detecting device 70 moves away from the shovel 100, the movable range MS increases. For example, the controller 30 may be configured to update the movable range MS for each predetermined control period.

The controller 30 determines whether the driven body exits the movable range MS when the driven body is moved through the manual operation performed via the operating device 26. If it is determined that the driven body exits the movable range MS, the movement of the driven body is determined not to be movement in the movable range MS. If it is determined that the driven body does not exit the movable range MS, the movement of the driven body is determined to be movement in the movable range MS.

If it is determined that the driven body does not exit the movable range MS, that is, if the movement of the driven body is determined to be movement in the movable range MS, the controller 30 does not restrict the movement of the driven body. For example, when the right turn operation is performed, in a case where the digging attachment is determined not to exit the movable range MS even when the upper-part swing body 3 turns right, the controller 30 allows the upper-part swing body 3 to turn right, without restricting the right turn of the upper-part swing body 3.

In contrast, if it is determined that the driven body exits the movable range MS and enters the restricted range RS, that is, if the movement of the driven body is determined not to be movement in the movable range MS, the controller 30 restricts the movement of the driven body. For example, when the right turn operation is performed, in a case where the digging attachment is determined to exit the movable range MS when the upper-part swing body 3 turns right, the controller 30 prohibits the upper-part swing body 3 from turning right, without allowing the upper-part swing body 3 to turn right.

If movement of the driven body is determined not to be restricted (NO in step ST3), the controller 30 terminates the current movement restricting process.

When movement of the driven body is determined to be restricted (YES in step ST3), the controller 30 restricts the movement of the driven body (step ST4). In the present embodiment, the controller 30 starts braking the driven body when the driven body is already moved, and prohibits the movement of the driven body when the driven body is not yet moved.

Specifically, the controller 30 outputs a control command to the control valve 60 so that the pilot line CD1 changes to the shut-off state. Thereby, the controller 30 disables the operation via the operating device 26.

More specifically, when prohibiting the swing of the upper-part swing body 3, the controller 30 outputs a control command to the control valve 60 so that the pilot line CD1 changes to the shut-off state. Thereby, the controller 30 disables the operation via the left control lever 26L. Similarly, when prohibiting the backward travel of the lower-part traveling body 1, the controller 30 outputs a control command to the control valve 60 so that the pilot line CD1 changes to the shut-off state. Thereby, the controller 30 disables the operation via the travel lever 26D.

In such a configuration, even when the object is detected in the workspace WS, the controller 30 can cause a given driven body to move while causing the object and the shovel 100 to not be in contact, without uniformly restricting or prohibiting the movement of the driven body. Thereby, when the object is detected in the workspace WS, the movement of the shovel 100 can be prevented from being uniformly restricted.

Note that any order of step ST1 and step ST2 may be adopted. Step ST1 may be taken after step ST2 is taken, or be taken simultaneously with step ST2.

In the above embodiments, when restricting the movement of the driven body, the controller 30 disables all operations via the operating devices 26. However, the controller 30 may be configured such that the left control lever 26L, the right control lever 26R, and the travel levers 26D can individually change to the inactive state. For example, the controller 30 may be configured to allow the travel levers 26D to be in the inactive state, while causing the left control lever 26L and the right control lever 26R to be in the active state. Such a configuration may be achieved by, for example, using multiple control valves 60. Further, in the above embodiments, the control valve 60 is disposed on the pilot line that couples the pilot pump 15 with each of the operating devices 26. However, respective control valves 60 may be disposed on the pilot lines each of which couples a given operating device 26 with a corresponding control valve from among the control valves 171 to 176. For example, the control valve 60 for a raise operation of the boom may be disposed on a given pilot line that couples the right control lever 26R with the control valve 175.

Hereafter, examples of setting the movable range MS and the restricted range RS will be described with reference to FIGS. 4 to 7. FIGS. 4 to 7 are top views of the shovel where the examples of setting the movable range MS and the restricted range RS are illustrated. In the examples of FIGS. 4 to 7, another shovel 200 exists in the workspace WS included in the detection space DS that is set at the shovel 100. In FIGS. 4 to 7, the movable range MS is expressed by dot hatching.

A situation where the shovel 100 is proximal to the other shovel 200 occurs when a plurality of construction machines operate simultaneously in a narrow space such as in a tunnel, in a parking space, or in a dismantlement space. Even under the situation, by setting the movable range MS and the restricted range RS as described below, the controller 30 actualizes the detection of an entering object, as well as actualizing the stop or brake such as deceleration of a given driven body, due to the entering object, without reducing the operational efficiency for the shovel 100.

The controller 30 acquires information about a state of the shovel 200, based on the output of the object detecting device 70. The controller 30 further sets the movable range MS based on the acquired information, and allows the movement of the driven body in the movable range MS. In contrast, the controller 30 restricts or prohibits the movement of the driven body in the restricted range RS, which is a range outside of the movable range MS, in the workspace WS. The information about the state of the shovel 200 includes, for example, information about a motion trajectory of the shovel 200.

For example, when the shovel 200 is held stationary as illustrated in FIG. 4, the controller 30 can cause the upper-part swing body 3 to turn right by an angle $\alpha$, and sets the movable range MS as a range in which the upper-part swing body 3 can turn left by an angle $\beta$. A shovel 100R as expressed by a dashed line, indicates the state of the shovel 100 when the upper-part swing body 3 turns right by the angle $\alpha$. A shovel 100L as expressed by a dashed line, indicates the state of the shovel 100 when the upper-part swing body 3 turns left by the angle $\beta$.

Figure 5:
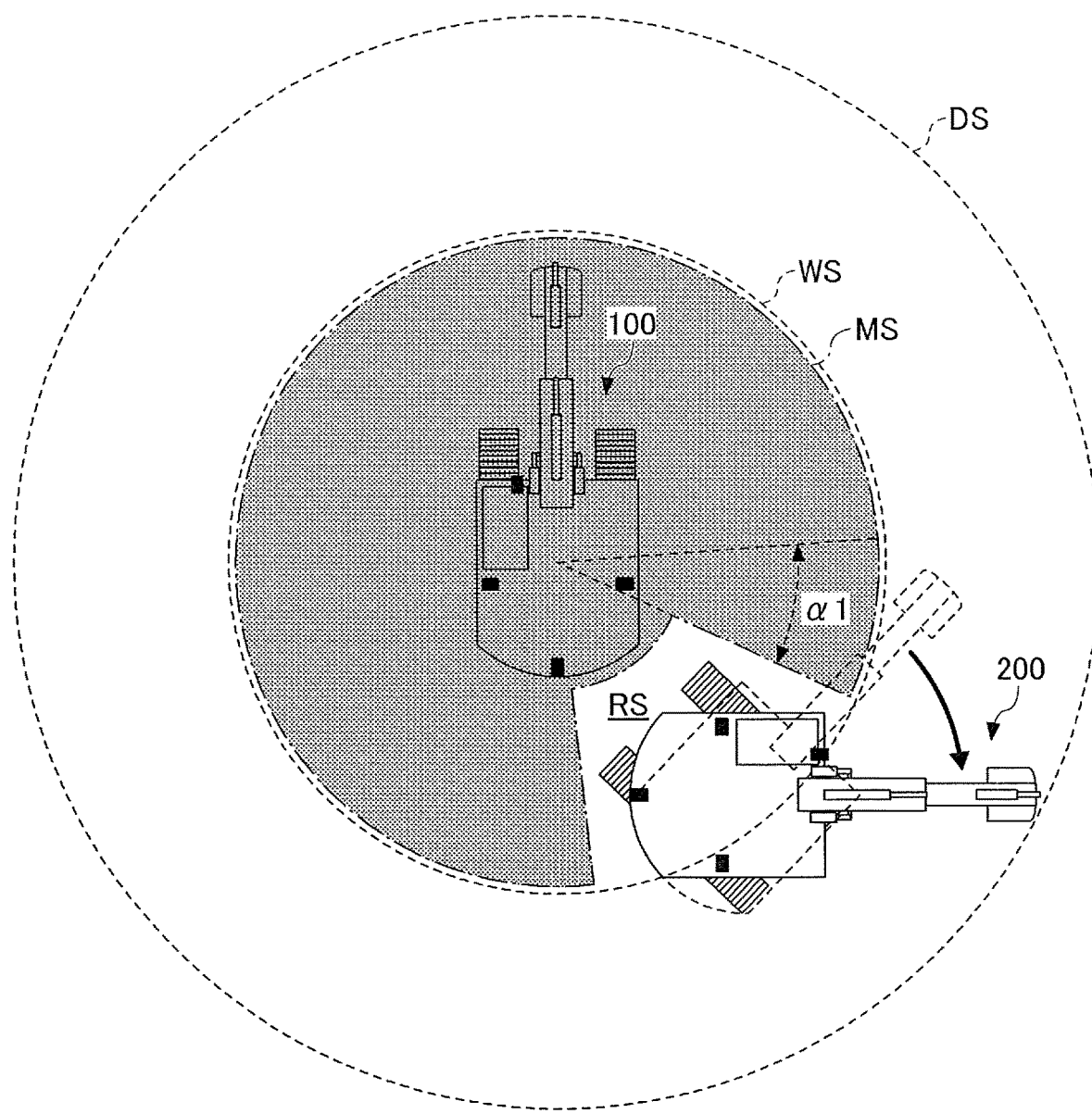
FIG. 5 is a top view of the shovel where another example of setting of the movable range and the restricted range is illustrated.

When detecting that the shovel 200 turns right as illustrated in FIG. 5, the controller 30 increases the movable range MS in comparison to the case described in FIG. 4. Specifically, the controller 30 increases an angle at which right turn can be performed, by an angle $\alpha 1$.

Figure 6:
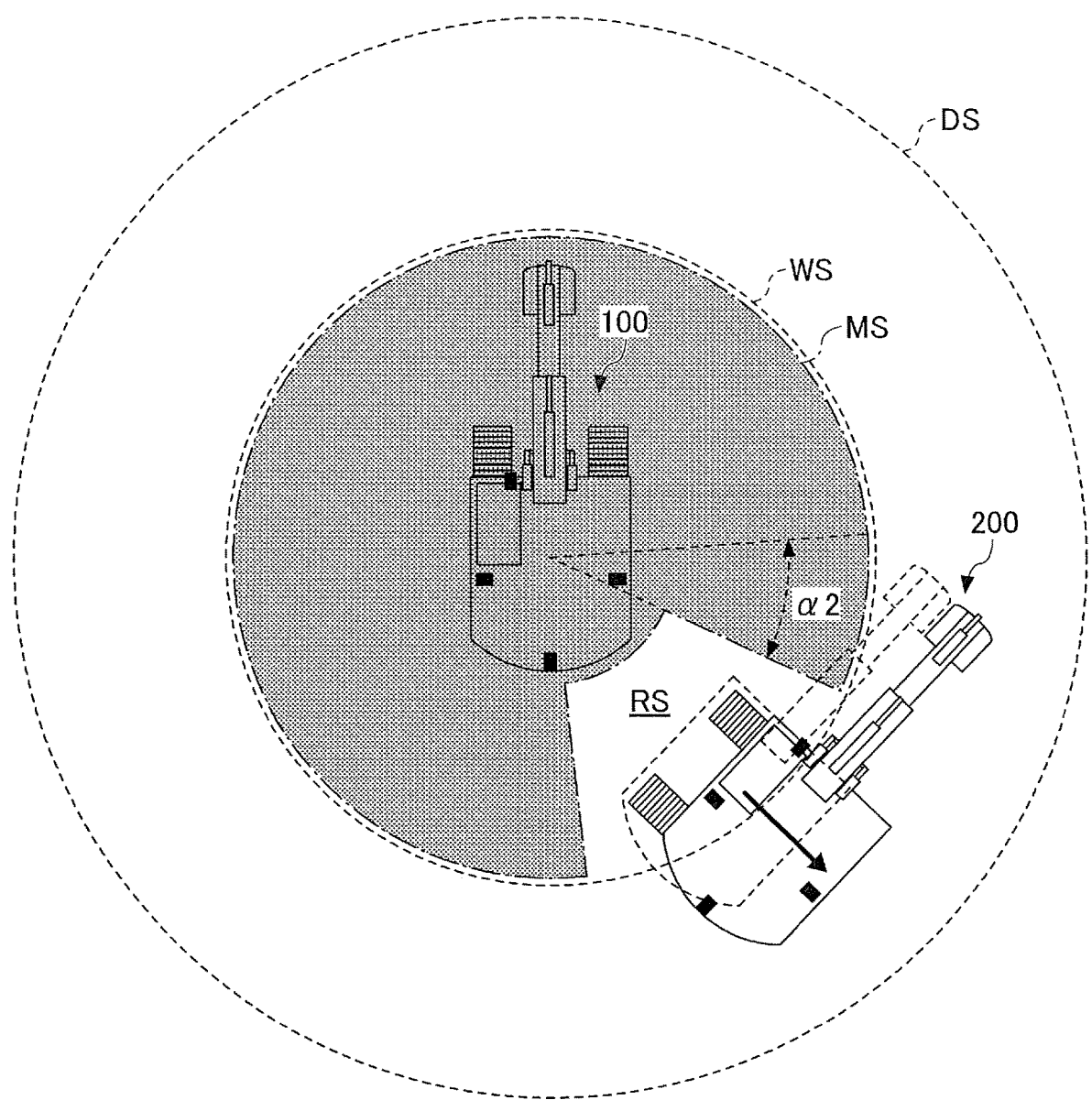
FIG. 6 is a top view of the shovel where yet another example of setting of the movable range and the restricted range is illustrated.

When detecting that the shovel 200 travels in a direction away from the shovel 100 as illustrated in FIG. 6, the controller 30 increases the movable range MS in comparison to the case described in FIG. 4. Specifically, the controller 30 increases an angle at which right turn can be performed, by an angle $\alpha 2$.

Figure 7:
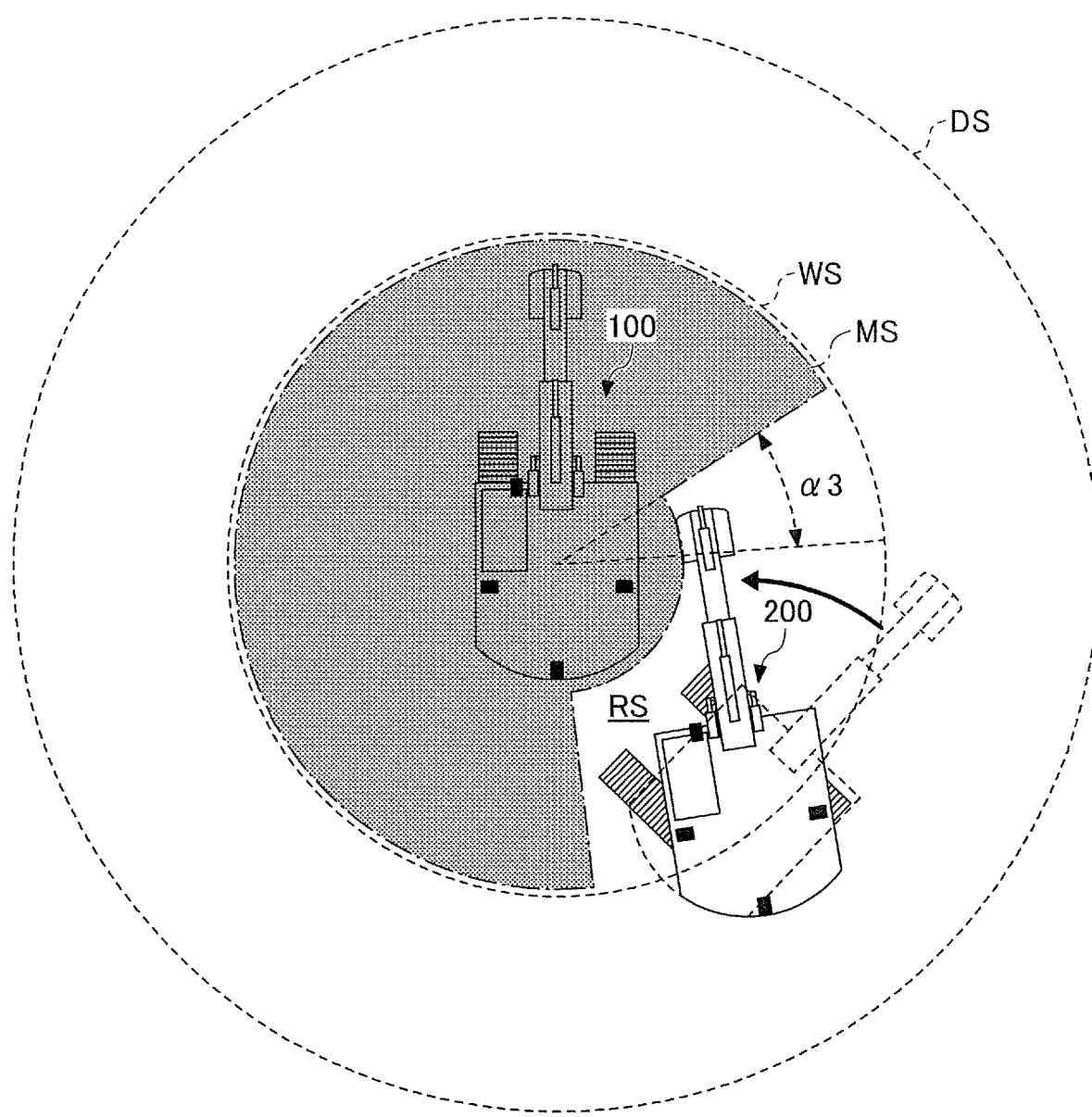
FIG. 7 is a top view of the shovel where yet another example of setting of the movable range and the restricted range is illustrated.

In contrast, when detecting that the shovel 200 turns left as illustrated in FIG. 7, the controller 30 reduces the movable range MS in comparison to the case described in FIG. 4. Specifically, the controller 30 reduces an angle at which right turn can be performed, by an angle $\alpha 3$.

As described above, the controller 30 may set, as the movable range MS, a range not overlapping with a range derived from the motion trajectory of the shovel 200, within the workspace WS derived from the motion trajectory of the shovel 100.

Figure 8:
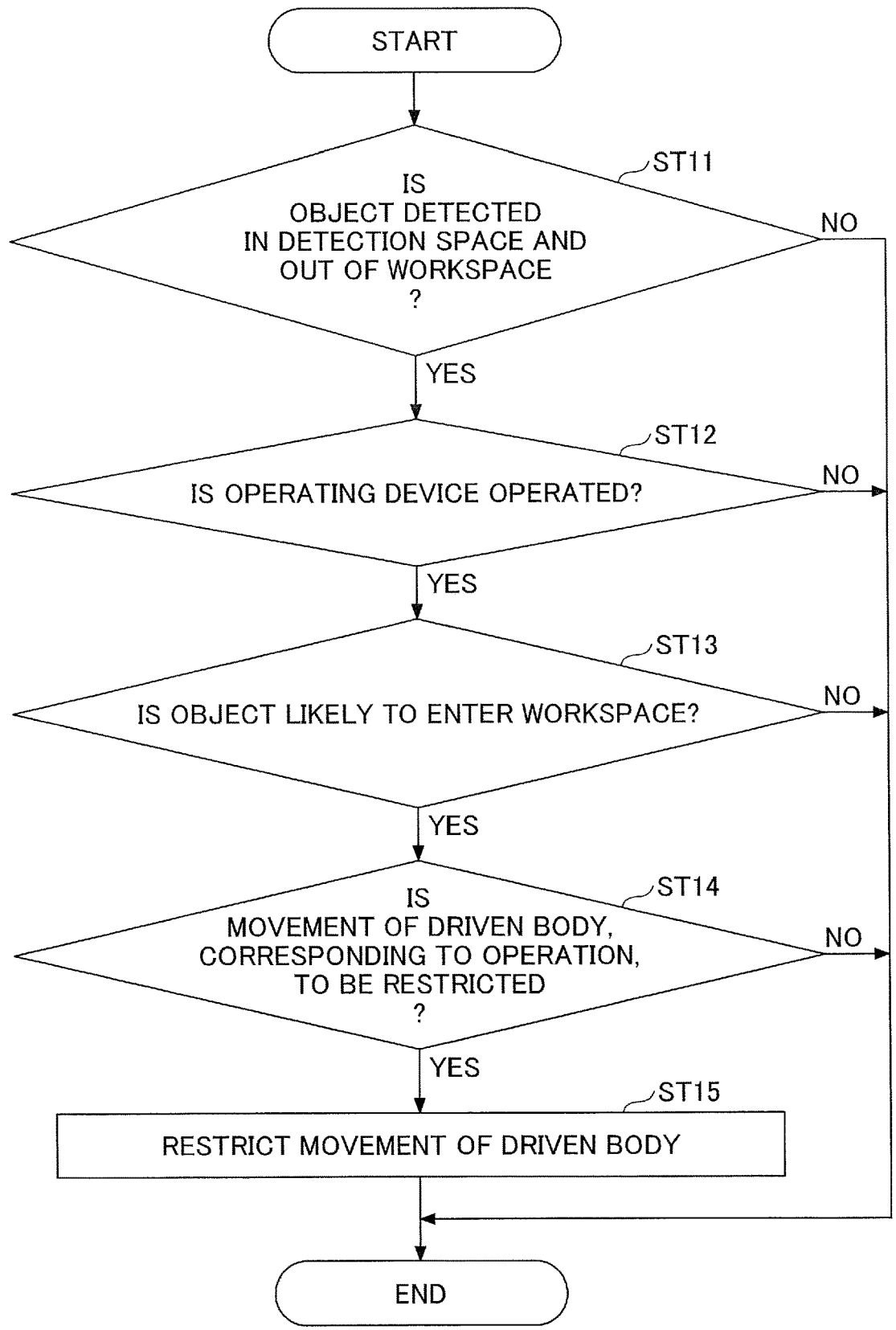
FIG. 8 is a flowchart illustrating another example of the movement restricting process.

Hereafter, another example of the movement restricting process will be described with reference to FIG. 8. FIG. 8 is a flowchart of another example of the movement restricting process. For example, the controller 30 performs the movement restricting process repeatedly in a predetermined control period.

First, the controller 30 determines whether an object is detected in the detection space DS and out of the workspace WS (step ST11). In the present embodiment, the controller 30 determines whether the other shovel 200 is detected in the detection space DS and out of the workspace WS, based on the output of the object detecting device 70.

If it is determined that an object is not detected (NO in step ST11), the controller 30 terminates the current movement restricting process.

If it is determined that an object is detected (YES in step ST11), the controller 30 determines whether the operating device 26 is operated (step ST12). In the present embodiment, the controller 30 determines whether the operating device 26 is operated based on the output of the operating pressure sensor 29.

If it is determined that the operating device 26 is not operated (NO in step ST12), the controller 30 terminates the current movement restricting process.

If it is determined that the operating device 26 is operated (YES in step ST12), the controller 30 determines whether the object is likely to enter the workspace WS (step ST13).

If it is determined that the object is not likely to enter the workspace WS (NO in step ST13), the controller 30 terminates the current movement restricting process.

If it is determined that the object is likely to enter the workspace WS (YES in step ST13), the controller 30 determines whether to restrict movement of a given driven body, corresponding to the operation (step ST14). In other words, the controller 30 determines whether to allow the movement of the driven body, corresponding to a manual operation via the operating device 26. In the present embodiment, the controller 30 acquires information about the pose of the shovel 100, based on the output of the pose sensors, and determines whether the movement of the driven body is movement in the movable range, based on the acquired information. Specifically, if the driven body is moved through the manual operation via the operating device 26, it is determined whether the driven body exits the movable range MS.

If it is determined that the driven body does not exit the movable range MS, the controller 30 does not restrict the movement of the driven body. For example, when a right turn operation is performed, in a case where, even when the upper-part swing body 3 turns right, the digging attachment is determined not to exit the movable range MS, the controller 30 does not prohibit the upper-part swing body 3 from turning right, i.e., allows the upper-part swing body 3 to turn right.

In contrast, if it is determined that the driven body exits the movable range MS, that is, if the driven body is determined to enter the restricted range RS, the controller 30 prohibits the movement of the driven body. For example, when the right turn operation is performed, in a case where it is determined that the digging attachment exits the movable range MS when the upper-part swing body 3 turns right, the controller 30 prohibits the upper-part swing body 3 from turning right.

If it is determined that the movement of the driven body is not to be restricted (NO in step ST14), the controller 30 terminates the current movement restricting process.

If it is determined that the movement of the driven body is to be restricted (YES in step ST14), the controller 30 restricts the movement of the driven body (step ST15). In the present embodiment, when the driven body is already moved, the controller 30 starts braking the driven body, and prohibits the movement of the driven body when the driven body is not yet moved.

Specifically, the controller 30 outputs a control command to the control valve 60 so that the pilot line CD1 changes to the shut-off state. Thereby, the controller 30 disables the operation via a given operating device 26.

More specifically, when prohibiting the swing of the upper-part swing body 3, the controller 30 outputs a control command to the control valve 60 so that the pilot line CD1 changes to the shut-off state. Thereby, the controller 30 disables the operation via the left control lever 26L. Similarly, when prohibiting the backward travel of the lower-part traveling body 1, the controller 30 outputs a control command to the control valve 60 so that the pilot line CD1 changes to the shut-off state. Thereby, the controller 30 disables the operation via a given travel lever 26D.

In such a configuration, when the shovel 200 present in the detection space DS and out of the workspace WS is likely to enter the workspace WS, the controller 30 can narrow the movable range MS, even when the shovel 200 has not yet entered the workspace WS. Thereby, contact between the shovel 100 and the shovel 200 can be prevented more reliably.

Note that any order of step ST11 and step ST12 may be adopted. Step ST11 may be taken after step ST12 is taken, or be taken simultaneously with step ST12.

In the above embodiments, when restricting the movement of the driven body, the controller 30 disables all operations via the operating devices 26. However, the controller 30 may be configured such that the left control lever 26L, the right control lever 26R, and the travel levers 26D can individually change to the inactive state. For example, the controller 30 may be configured to allow the travel levers 26D to be in the inactive state, while causing the left control lever 26L and the right control lever 26R to be in the active state. Such a configuration may be achieved by, for example, using multiple control valves 60.

Figure 9:
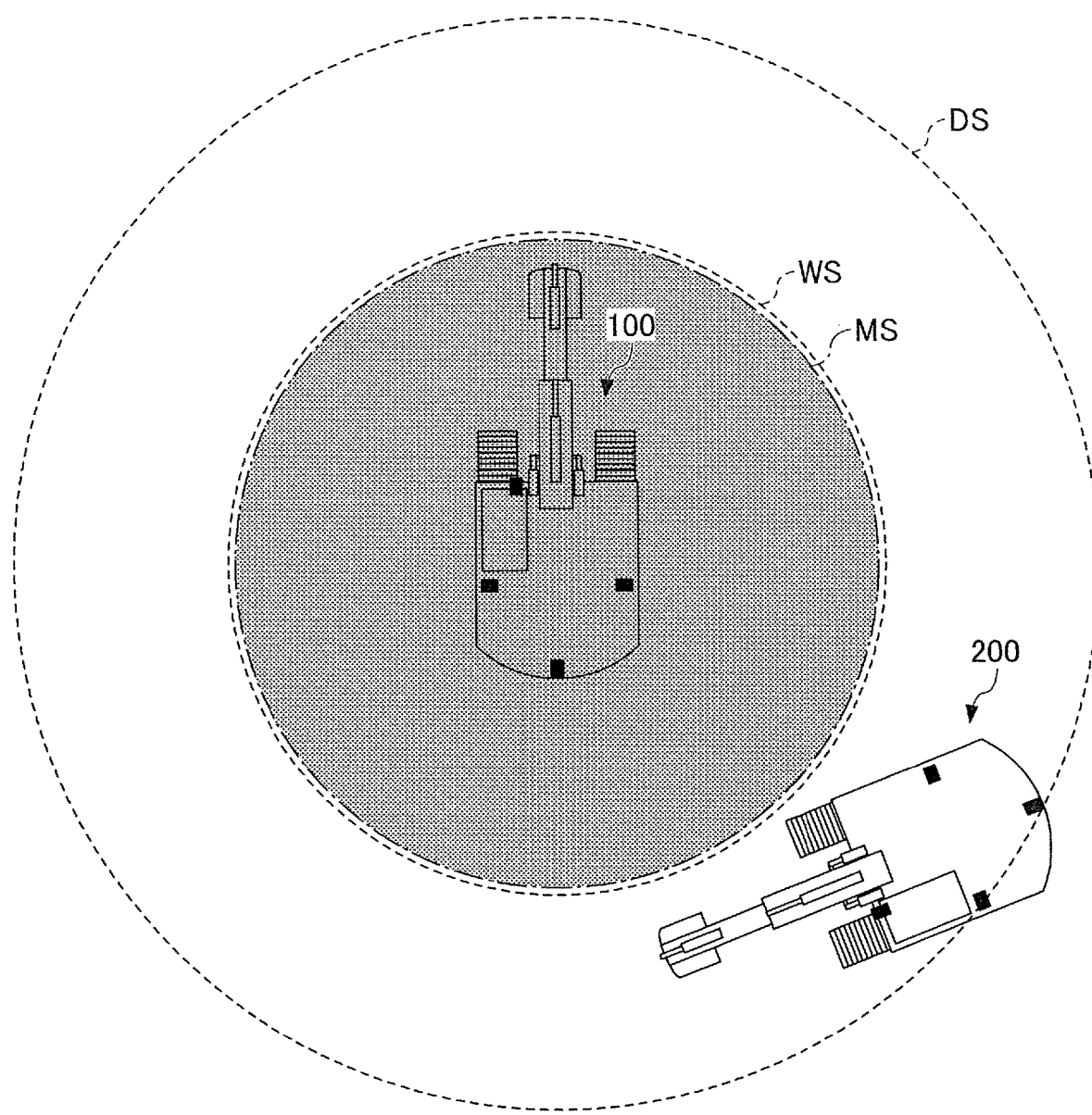
FIG. 9 is a top view of the shovel where yet another example of setting of the movable range and the restricted range is illustrated.
Figure 10:
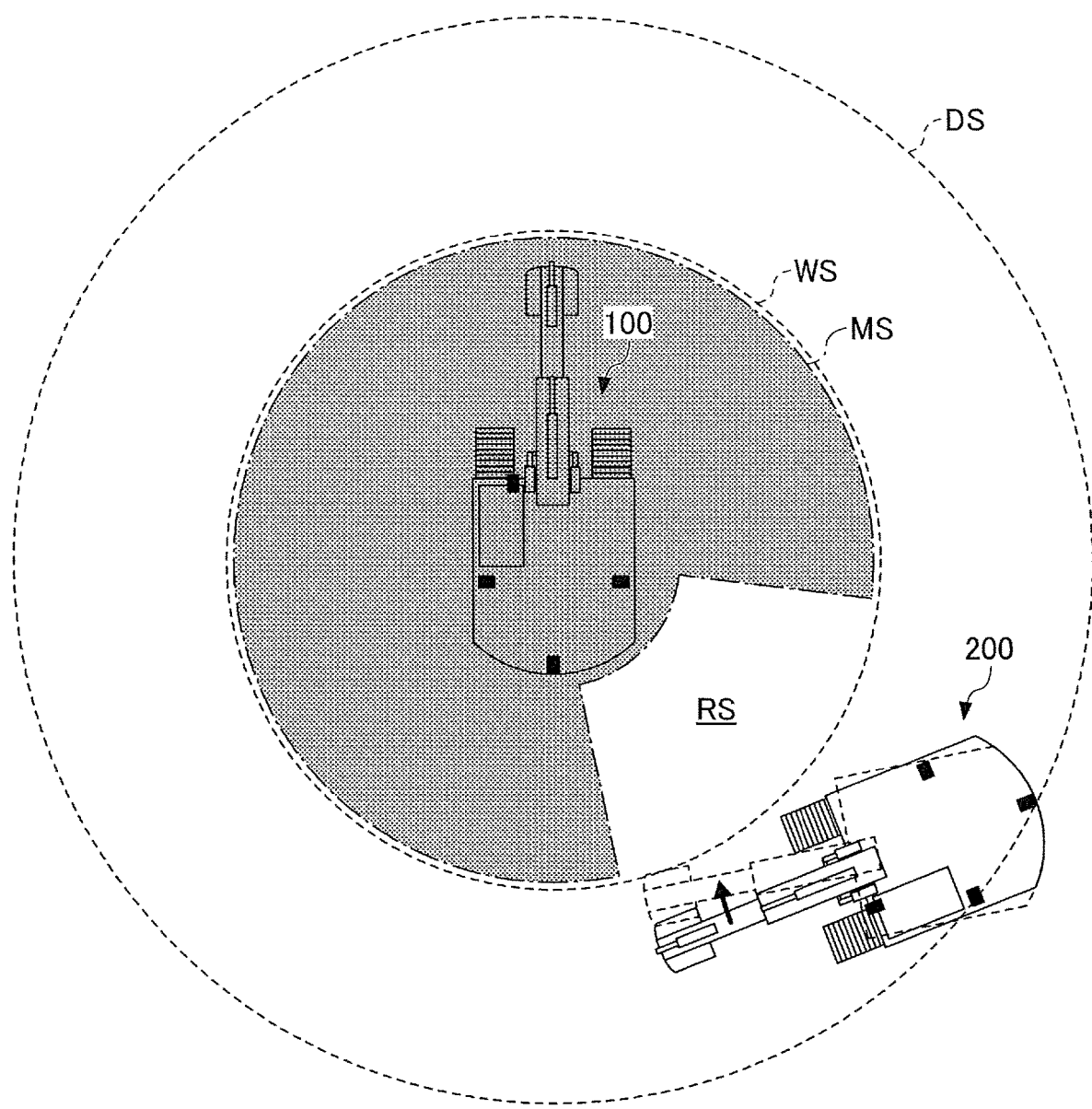
FIG. 10 is a top view of the shovel where yet another example of setting of the movable range and the restricted range is illustrated.
Figure 11:
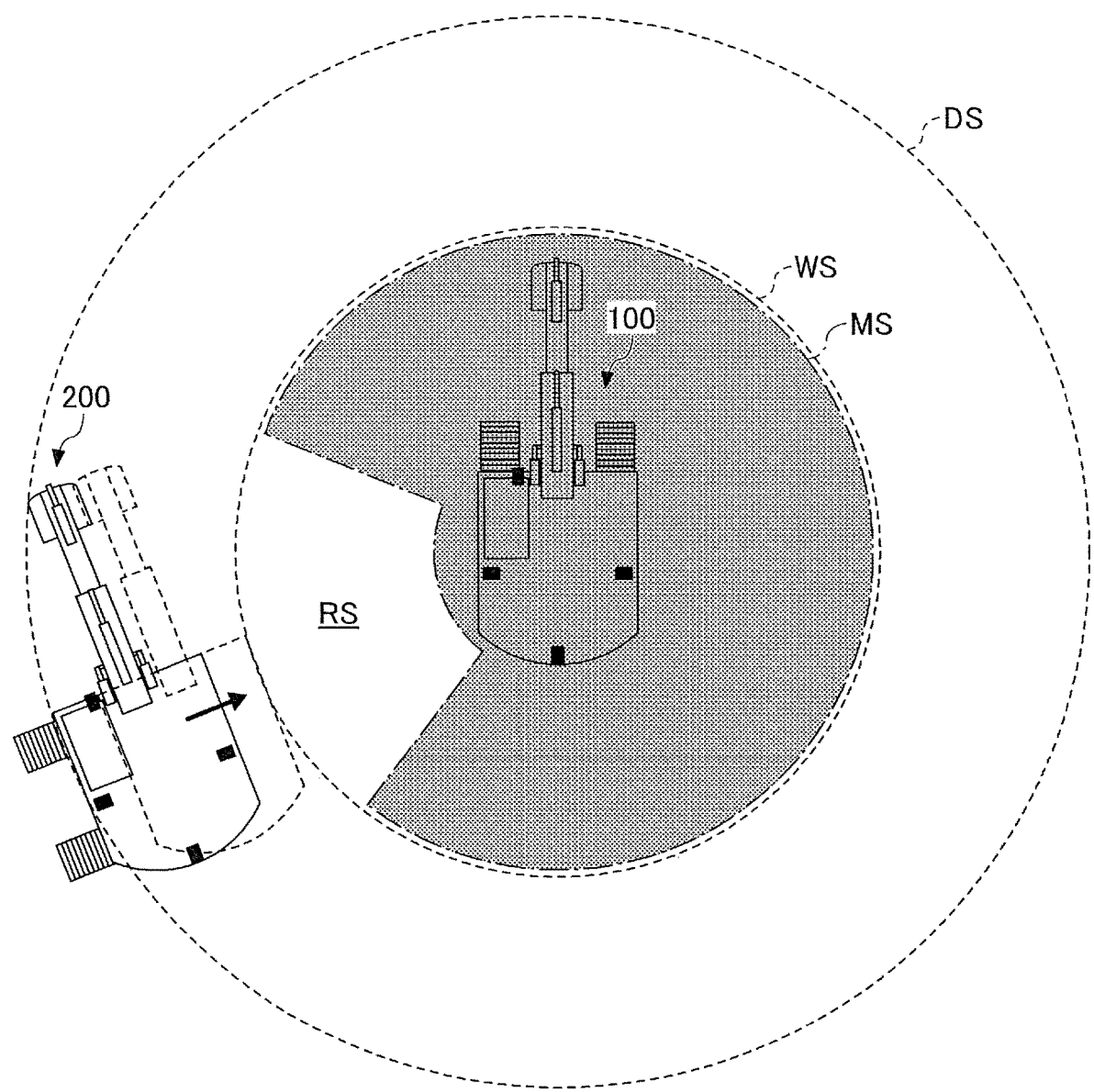
FIG. 11 is a top view of the shovel where yet another example of setting of the movable range and the restricted range is illustrated.

Hereafter, other examples of setting the movable range MS and the restricted range RS will be described with reference to FIGS. 9 to 11. FIGS. 9 to 11 are top views of the shovel where the other examples of setting the movable range MS and the restricted range RS are illustrated. In the examples in FIGS. 9 to 11, the other shovel 200 exists in the detection space DS of the shovel 100 and out of the workspace WS. In FIGS. 9 to 11, the movable range MS is expressed by dot hatching.

The controller 30 acquires information about a state of the shovel 200, based on the output of the object detecting device 70. The controller 30 further sets the movable range MS based on the acquired information, and allows movement of the driven body in the movable range MS. In contrast, the controller 30 restricts or prohibits the movement of the driven body in the restricted range RS, which is a range outside of the movable range MS, in the workspace WS. The information about the state of the shovel 200 includes, for example, information about the motion trajectory of the shovel 200.

For example, when the shovel 200 is held stationary as illustrated in FIG. 9, the controller 30 sets the whole workspace WS as the movable range MS.

When detecting that the shovel 200 turns right as illustrated in FIG. 10, the controller 30 decreases the movable range MS in comparison to the case described in FIG. 9. Specifically, a right rear range of the shovel 100 is set as the restricted range RS.

Further, when detecting that the shovel 200 travels in a direction in which the shovel 200 moves closer to the shovel 100 as illustrated in FIG. 11, the controller 30 decreases the movable range MS in comparison to the case described in FIG. 9. Specifically, a left side range of the shovel 100 is set as the restricted range RS.

As described above, the controller 30 may set, as the movable range MS, a range not overlapping with a range derived from the motion trajectory of the shovel 200, within the workspace WS derived from the motion trajectory of the shovel 100.

Figure 12A:
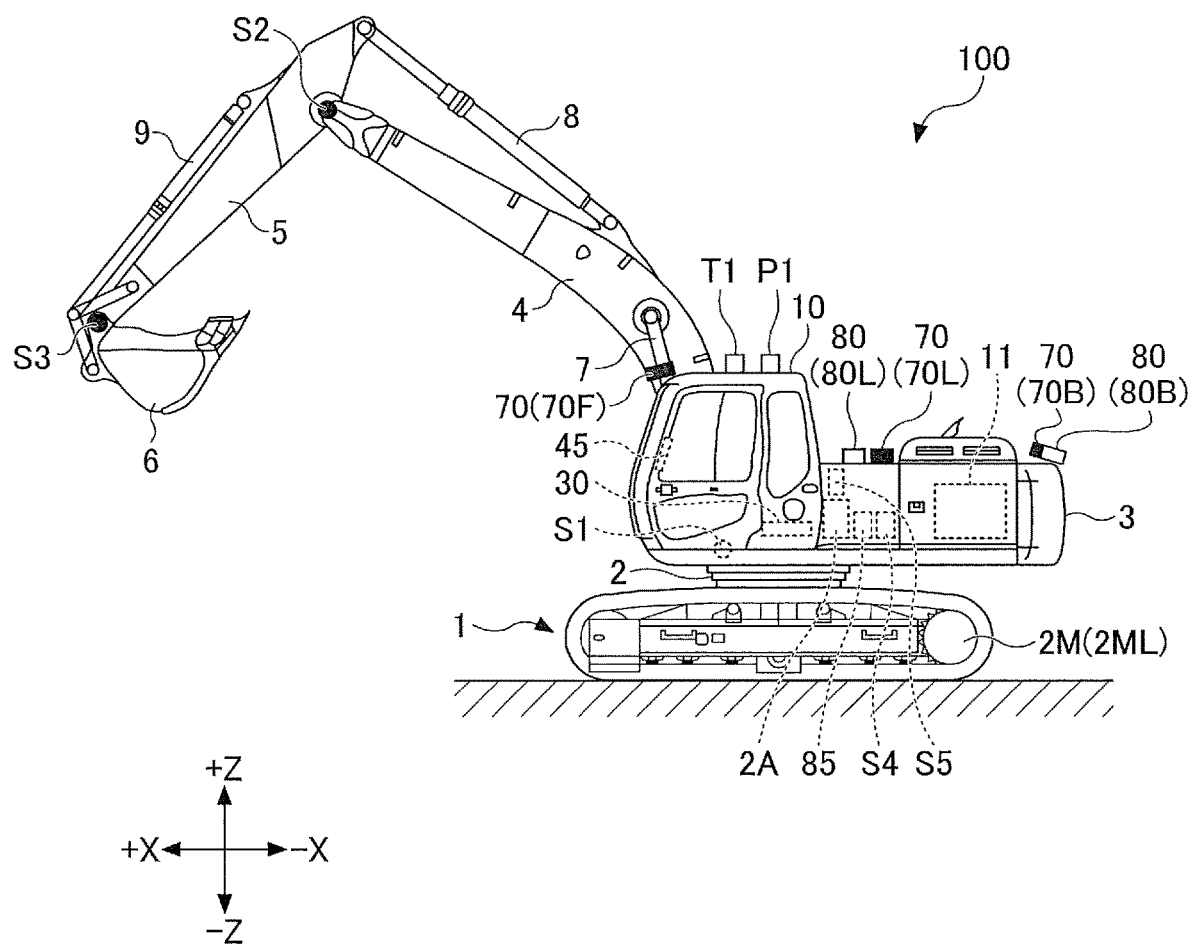
FIG. 12A is a side view of another example of the configuration of the shovel according to the embodiment of the present disclosure.
Figure 12B:
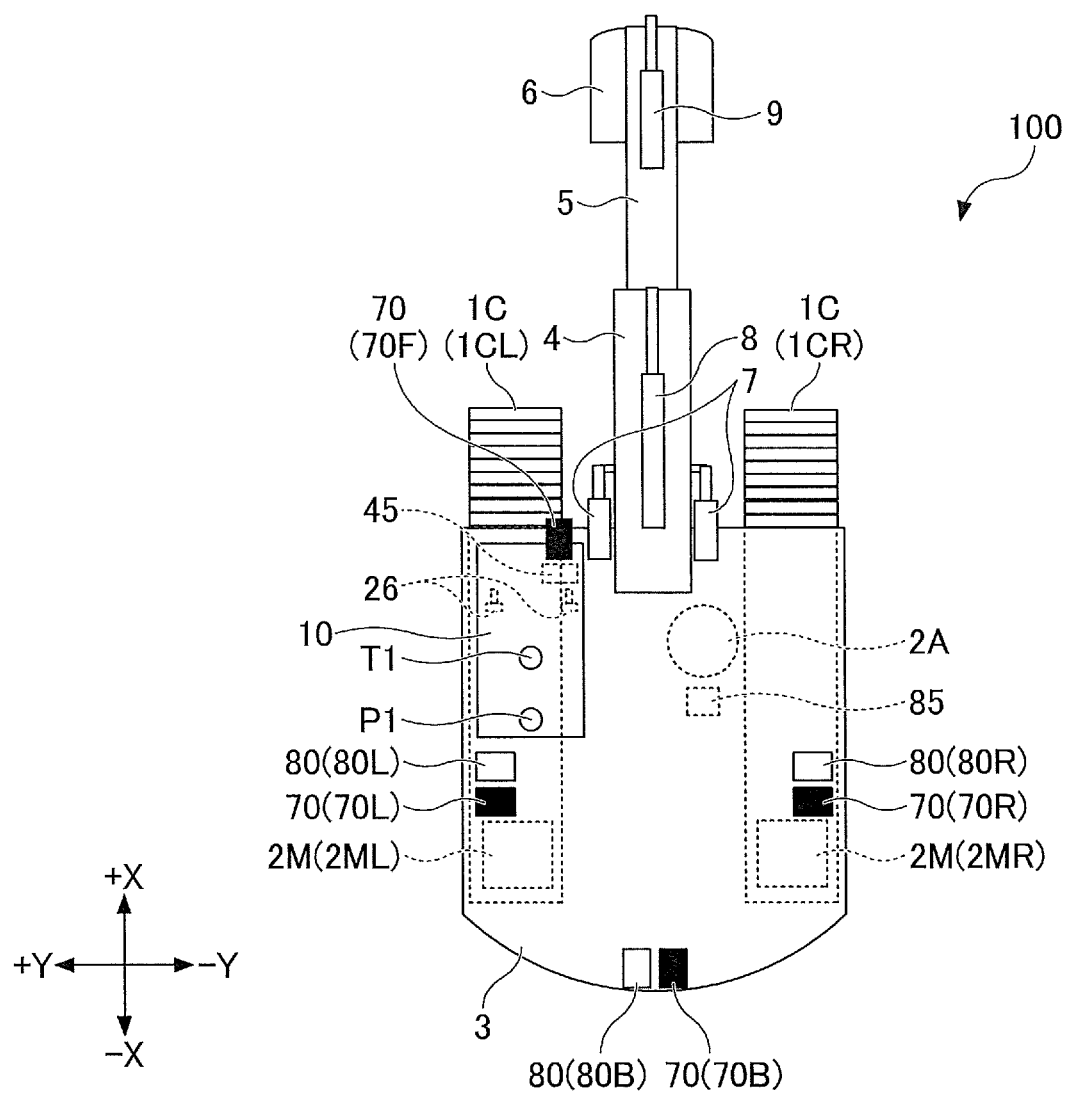
FIG. 12B is a top view of another example of the configuration of the shovel according to the embodiment of the present disclosure.

Hereafter, an example of another configuration of the shovel 100 will be described with reference to FIGS. 12A and 12B. FIGS. 12A and 12B are diagrams illustrating another example of the configuration of the shovel 100. FIG. 12A is a side view of the shovel, and FIG. 12B is a top view of the shovel.

The shovel illustrated in FIGS. 12A and 12B differs from the shovel 100 illustrated in FIG. 1, in that a display device 45, imaging devices 80, a communication device T1, and a positioning device P1 are provided. However, the shovels are common in other respects. Accordingly, explanation for the common portions will be omitted, and portions that differ will be described in detail.

The display device 45 is configured to display various information. The display device 45 may be connected to the controller 30 via a communication network such as a CAN. Alternatively, the display device 45 may be connected to the controller 30 via a dedicated line.

Each imaging device 80 captures an image of the surroundings of the shovel 100. In the examples illustrated in FIGS. 12A and 12B, a rear camera 80B attached to a rear end of the upper surface of the upper-part swing body 3; a left camera 80L attached to a left end of the upper surface of the upper-part swing body 3; and a right camera 80R attached to a right end of the upper surface of the upper-part swing body 3, are included. The imaging devices 80 may include a front camera.

The rear camera 80B is disposed next to a rear sensor 70B, the left camera 80L is disposed next to a left sensor 70L, and the right camera 80R is disposed next to a right sensor 70R. When the imaging devices 80 include the front camera, the front camera may be disposed next to a front sensor 70F.

An image captured by each imaging device 80 is displayed on the display device 45 provided in the cab 10. Each imaging device 80 may be configured such that a top-view transformation image such as an overhead view image can be displayed on the display device 45. For example, the overhead view image is formed by combining respective images that are output from the rear camera 80B, the left camera 80L, and the right camera 80R.

The communication device T1 is configured to control the communication with an external device existing outside the shovel 100. In the present embodiment, the communication device T1 controls the communication with the external device, via a satellite communication network, a mobile communication network, the Internet network, or the like.

The positioning device P1 is configured to measure the location of the upper-part swing body 3. The positioning device P1 may be configured to be able to measure the orientation of the upper-part swing body 3. In the present embodiment, the positioning device P1 is a GNSS compass. The positioning device P1 detects the location and orientation of the upper-part swing body 3, and outputs a detected value to the controller 30.

In such a configuration, the shovel 100 illustrated in FIGS. 12A and 12B can display an image of the object detected by the object detecting device 70, on the display device 45. Thereby, when the movement of the driven body is restricted or prohibited, the operator of the shovel 100 can immediately check a state of the object that causes the restriction or prohibition, by viewing the image displayed on the display device 45.

Further, the shovel 100 illustrated in FIGS. 12A and 12B is configured to be able to exchange various information with the shovel 200, via the communication device T1. The exchanged information includes at least one from among information about the location and orientation of each shovel; information about the manual operation via a given operating device 26; and the like. Thereby, the shovel 100 can acquire detailed information about the state of the shovel 200, in comparison to the case of being acquired via the object detecting device 70. Accordingly, the movable range MS can be set more appropriately.

Figure 13:
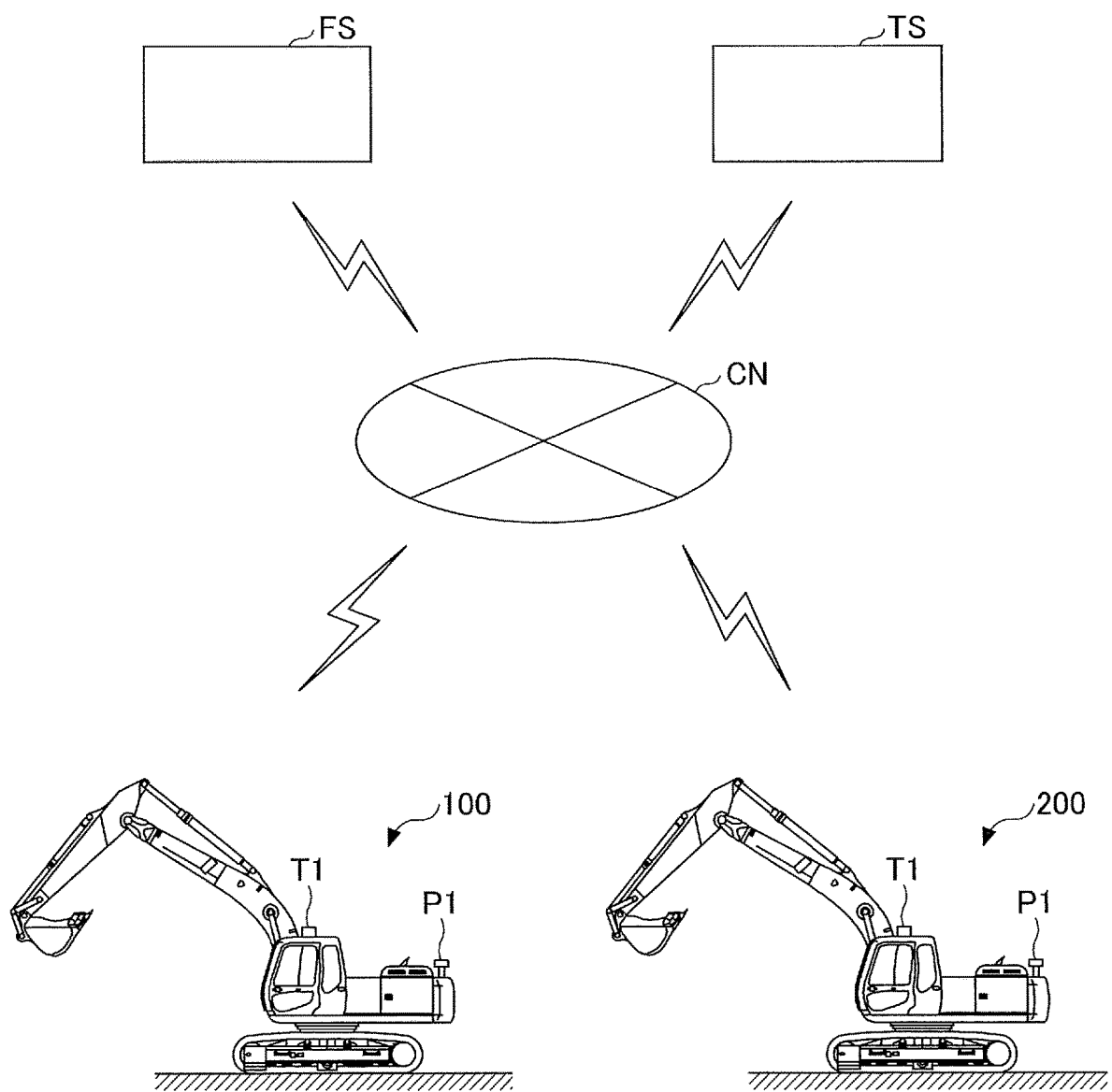
FIG. 13 is a diagram illustrating an example of a construction support system.

Hereafter, referring to FIG. 13, a construction support system that supports construction through the shovels, by allowing transmission and reception of information between shovels, will be described. FIG. 13 is a diagram schematically illustrating an example of the construction support system. As illustrated in FIG. 13, the construction support system includes the shovel 100; the shovel 200; a management device FS; and a mobile terminal TS as a support device. The shovel 100; the shovel 200; the management device FS; and the mobile terminal TS, serve as communication terminals that are connected to each other through a communication network CN. The number of each of management devices FS and mobile terminals TS that constitutes part of the construction support system may be one or more.

The number of shovels that constitute part of the construction support system may be three or more. In the example of FIG. 13, the construction support system includes one management device FS and one mobile terminal TS.

As illustrated in FIG. 13, each of the shovel 100 and the shovel 200 includes the positioning device P1 and the communication device T1. Each communication device T1 transmits information externally. For example, a given communication device T1 transmits information that can be received by at least one from among the management device FS, the mobile terminal TS, and the other communication device T1.

The management device FS is a device that manages the operation of each shovel, and is a computer with a display device, the computer being installed in, for example, a management center or the like out of a worksite. The management device FS may be a portable computer capable of being carried by a user. The mobile terminal TS is a communication terminal with a display device, and includes a smartphone, a tablet terminal, a laptop computer, or the like.

When acquiring, for example, information about the location and orientation of the shovel 100; information about the manual operation via the operating device 26; or the like, the communication device T1 of the shovel 100 transmits the information to the management device FS through the communication network CN. The communication device T1 of the shovel 200 has the same configuration as the communication device T1 of the shovel 100.

For example, the management device FS derives, from received information, information about a relative positional relationship between the shovel 100 and the shovel 200, and may generate information necessary for each of the shovel 100 and the shovel 200 to perform the movement restricting process. Further, the generated information may be transmitted to each of the shovel 100 and the shovel 200. Alternatively, the management device FS may serve as a repeater that directly transmits information received from the shovel 100 to the shovel 200.

The above process performed by the management device FS may be performed at the mobile terminal TS. Further, the communication device T1 of the shovel 100 and the communication device T1 of the shovel 200 may directly exchange information without using the management device FS and the mobile terminal TS. Alternatively, the communication device T1 of the shovel 100 and the communication device T1 of the shovel 200 may directly exchange information without using the communication network CN.

In such a configuration, the shovel 100 can exchange various information with the shovel 200, via the communication device T1. The exchanged information includes at least one from among information about the location and orientation of each shovel; information about the manual operation via the operating device 26; and the like. Thereby, the shovel 100 can acquire detailed information about the state of the shovel 200. Accordingly, the movable range MS can be set more appropriately. The shovel 200 has the same configuration as the shovel 100.

At least one from among the mobile terminal TS and the management device FS may include an operating device for remote control. In this case, the operator may operate the shovel 100 using the operating device for remote control. The operating device for remote control is connected to the controller 30 of the shovel 100, for example, through the communication network CN. Hereafter, the exchange of information between the shovel 100 and the management device FS will be described. However, the following description applies similarly to the exchange of information between the shovel 100 and the mobile terminal TS, as well as to the exchange of information between the shovel 200 and each of the mobile terminal TS and the management device FS.

In the construction support system described above, the controller 30 of the shovel 100 may transmit, to the management device FS, information about at least one from among a time and location at which movement of a given driven body in the shovel 100 is restricted; a motion trajectory of each of the shovel 100 and the shovel 200 being estimated at the time of restriction; the movable range MS and the restricted range RS being set at the time of restriction; and the like. In this case, the controller 30 may transmit, to the management device FS, at least one from among the output of the object detecting device 70; one or more images captured by a given imaging device 80; and the like. The images may be a plurality of images captured during a predetermined period including a period in which the movement of the driven body is restricted. The predetermined period may include a period preceding a period in which the movement of the driven body is restricted, or include a period following a period in which the movement of the driven body is restricted. Further, the controller 30 may transmit, to the management device FS, at least one from among information about the operational content for the shovel 100, during a predetermined period including a period in which the movement of the driven body is restricted; information about the location of the shovel 100 and a change in the location; information about the pose of the shovel 100 and a change in the pose; information about a pose of the digging attachment and a change in the pose; and the like. Further, the controller 30 provided in the shovel 100 may transmit, to the management device FS, information received through communication with the shovel 200 present proximal to the shovel 100, as information about the shovel 100. For example, the information received from the shovel 200 includes at least one from among information about the operational content for the shovel 200, information about the location of the shovel 200 and a change in the location; information about the pose of the shovel 200 and a change in the pose; information about the location of the digging attachment provided in the shovel 200 and a change in the location; and the like. In such a configuration, an administrator using the management device FS can obtain information about the shovel 100. The controller 30 may transmit information about a worksite to the management device FS. The information about the worksite includes, for example, information about a type of place where the shovel 100 operates. The type of place where the shovel 100 operates includes, for example, in a tunnel; in a dismantlement space; a parking space; or the like.

In such a configuration, the construction support system allows information about the shovel 100 to be acquired during a predetermined period including a period in which the movement of the driven body is restricted, to be shared among the operator and the administrator of the shovel 100; and the operator, etc. of the other shovel.

As described above, the shovel 100 according to the embodiment of the present disclosure includes the lower-part traveling body 1; the upper-part swing body 3 rotatably provided above the lower-part traveling body 1; the object detecting device 70 provided in the upper-part swing body 3; the controller 30 as a control device that is provided in the upper-part swing body 3; and the driven bodies operated by the actuators. The object detecting device 70 is configured to detect an object in the detection space DS set in the surroundings of the shovel 100. The controller 30 is configured to vary the movable range MS being a range where the driven body can enter, based on the state of the object detected by the object detecting device 70. Specifically, the controller 30 is configured to: variably set the movable range MS being a range where a given driven body can enter, based on, for example, the state of the object in the detection space DS; and allow the movement of the driven body in the movable range MS. In such a configuration, the shovel 100 can continue to operate efficiently, while avoiding collision with the other object that operates nearby.

For example, there are cases where the operator of the shovel 100 visually has difficulty in determining a distance from the other shovel 200 that operates nearby. In particular, there are cases where the operator of the shovel 100 visually has difficulty in determining a distance between the shovel 200 that operates in the rear of the shovel 100, and the shovel 100. For this reason, when turning the shovel 100 or moving the shovel 100 backward, the operator of the shovel 100 may cause the shovel 100 to contact the shovel 200. However, the shovel 100 can acquire information about the state of the shovel 200, based on the output of the object detecting device 70. Thus, the swinging or traveling of the shovel 100 can be restricted or stopped as necessary. Thereby, the shovel 100 can avoid the contact between the shovel 100 and the shovel 200. The burden on the operator of the shovel 100 can be reduced. Further, operational efficiency for the shovel 100 can be improved.

The state of the object in the detection space DS may include a current state or a future state of the object. In other words, the controller 30 may be configured to: variably set the movable range MS being a range where a given driven body of the shovel 100 can enter, based on the current state or the future state of the shovel 200 in the detection space DS; and allow the movement of the driven body in the movable range MS. The future state of the shovel 200 may be estimated based on at least one from among a past state and the current state of the shovel 200.

The controller 30 may variably set the movable range MS, such that the movable range MS decreases when the shovel 200 being detected by the object detecting device 70 moves closer to the shovel 100; or when the shovel 200 is estimated to move closer to the shovel 100. The controller 30 may also variably set the movable range MS, such that the movable range MS decreases when the shovel 200 being detected by the object detecting device 70 moves away from the shovel 100; or when the shovel 200 is estimated to move away from the shovel 100.

The controller 30 may be configured to acquire information about the state of the shovel 200 in the detection space DS, via at least one from among the object detecting device 70; and the communication device T1 that controls the communication with the shovel 200 in the detection space DS.

The controller 30 may be configured to: monitor the movement of the shovel 200 present in the detection space DS and out of the workspace WS included in the detection space DS; and brake the driven body of the shovel 100 when the shovel 200 is likely to enter the workspace WS. Specifically, the controller 30 may be configured to brake the swing of the upper-part swing body 3, or be configured to brake the travel of the lower-part traveling body 1.

The controller 30 may be configured to: monitor the movement of the shovel 200 in the detection space DS and out of the workspace WS included in the detection space DS; set the movable range MS variably based on the state of the shovel 200 when the shovel 200 is likely to enter the workspace WS; and allow the movement of the driven body of the shovel 100 in the movable range MS.

The driven body of the shovel 100 may include at least one from among the lower-part traveling body 1, the swing mechanism 2, the upper-part swing body 3, the boom 4, the arm 5, and the bucket 6.

The controller 30 may be configured to determine whether the shovel 200 present in the detection space DS and out of the workspace WS included in the detection space DS is likely to enter the workspace WS, based on the output of the object detecting device 70 over a previous predetermined period.

The preferred embodiments of the present disclosure have been described above in detail. However, the present disclosure is not limited to the embodiments described above. Various modifications, alternatives, or the like to the embodiments described above may be made without departing from a scope of the present disclosure. Also, the features described separately can be combined unless there is a technical inconsistency.

For example, in the embodiments described above, the hydraulic control lever with the hydraulic pilot circuit is disclosed. Specifically, in the hydraulic pilot circuit for the left control lever 26L as an arm control lever, the hydraulic oil that is supplied from the pilot pump 15 to the remote control valve of the left control lever 26L is transferred to the pilot port of the control valve 176, at a flow rate corresponding to the opening of the remote operation valve that is opened or closed by tilting the left control lever 26L.

However, instead of the hydraulic control lever with such a hydraulic pilot circuit, an electric control lever with an electric pilot circuit may be adopted. In this case, an operation amount of the lever being the electric control lever is input to the controller 30 as an electrical signal. A solenoid valve is also disposed between the pilot pump 15 and the pilot port of each of the control valves. Each solenoid valve is configured to operate in accordance with an electrical signal from the controller 30. In such a configuration, when the manual operation is performed using the electric control lever, the controller 30 controls a given solenoid valve based on the electrical signal corresponding to the operation amount of the lever, to thereby increase or decrease pilot pressure. Thereby, the controller 30 can cause a given control valve to operate in the control valve 17. Note that each control valve may include a solenoid spool valve. In this case, the solenoid spool valve operates in accordance with an electrical signal from the controller 30, the electrical signal corresponding to an operation amount of the lever that is the electric control lever.

Figure 14:
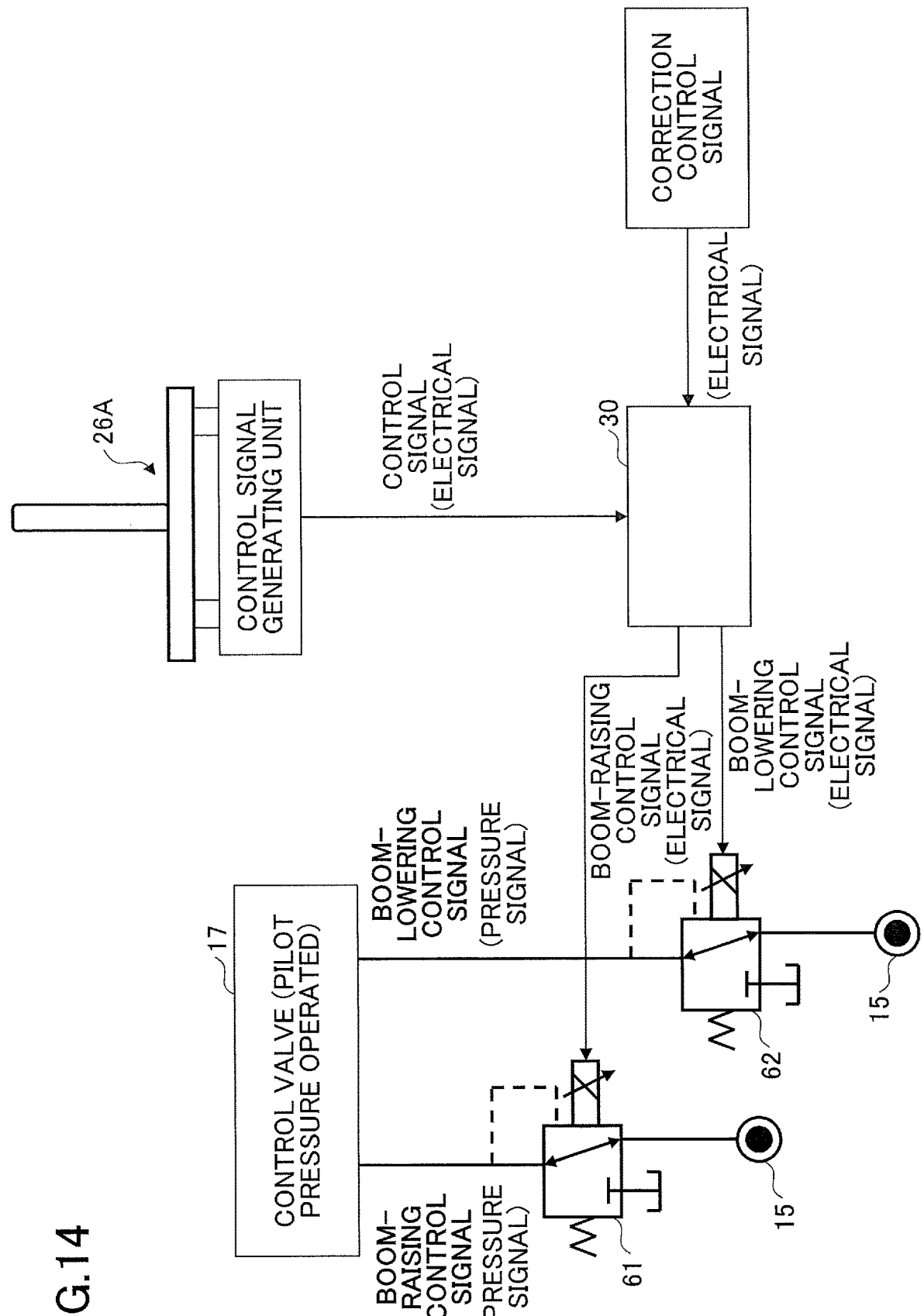
FIG. 14 is a diagram illustrating an example of the configuration of an electric operating system.

When an electric operating system including the electric control levers is adopted, the controller 30 can easily implement an autonomous control function in comparison to the case where the hydraulic operating system including the hydraulic control levers is adopted. FIG. 14 illustrates an example of the configuration of the electric operating system. Specifically, the electric operating system in FIG. 14 is an example of a boom operating system. The electric operating system mainly includes a pilot pressure operated control valve 17; a boom control lever 26A as an electric control lever; the controller 30; a solenoid valve 61 for a raise operation of the boom; and a solenoid valve 62 for a lower operation of the boom. The electric operating system in FIG. 14 may be applied to an arm operating system, a bucket operating system, or the like, as is the case with the boom operating system.

The pilot pressure operated control valve 17 includes the control valves 175 (see FIG. 2) for the boom cylinder 7; the control valves 176 (see FIG. 2) for the arm cylinder 8; the control valve 174 (see FIG. 2) for the bucket cylinder 9; and the like. The solenoid valve 61 is configured to be able to adjust a flow path area of a pipe line that couples the pilot pump 15 with a raise side pilot port of the control valve 175. The solenoid valve 62 is configured to be able to adjust the flow path area of a pipe line that couples the pilot pump 15 with a lower side pilot port of the control valve 175.

When the manual operation is performed, the controller 30 generates a boom-raising control signal (electrical signal) or a boom-lowering control signal (electrical signal), in accordance with a control signal (electrical signal) output from a control signal generating unit of the boom control lever 26A. The control signal output from the control signal generating unit of the boom control lever 26A is an electrical signal that varies depending on an operation amount and operation direction of the boom control lever 26A.

Specifically, when the boom control lever 26A is operated in a direction in which the boom is raised, the controller 30 outputs the boom-raising control signal (electrical signal) corresponding to an operation amount of the lever, to the solenoid valve 61. The solenoid valve 61 adjusts the flow path area in accordance with the boom-raising control signal (electrical signal), and controls pilot pressure with respect to the boom-raising control signal (pressure signal), the pilot pressure being applied to the raise side pilot port of the control valve 175. Similarly, when the boom control lever 26A is operated in a direction in which the boom is lowered, the controller 30 outputs the boom-lowering control signal (electrical signal) corresponding to an operation amount of the lever, to the solenoid valve 62. The solenoid valve 62 adjusts the flow path area in accordance with the boom-lowering control signal (electrical signal), and controls pilot pressure with respect to the boom-lowering control signal (pressure signal), the pilot pressure being applied to the lower side pilot port of the control valve 175.

When autonomous control is performed, the controller 30 generates the boom-raising control signal (electrical signal) or the boom-lowering control signal (electrical signal), in accordance with a correction control signal (electrical signal), instead of, for example, the control signal (electrical signal) output from the operation signal generating unit of the boom control lever 26A. The correction control signal may be an electrical signal generated by the controller 30, or an electrical signal generated by an external control device or the like, other than the controller 30.

It should be understood that the invention is not limited to the above-described embodiment, but may be modified into various forms on the basis of the spirit of the invention. Additionally, the modifications are included in the scope of the invention.

What is claimed is:

1. A shovel comprising:
   a lower-part traveling body;
   an upper-part swing body rotatably provided above the lower-part traveling body;
   an object detecting device provided in the upper-part swing body;
   a control device provided in the upper-part swing body;
   an operating device coupled to the control device; and
   driven bodies including the lower-part traveling body, the upper-part swing body, a boom, an arm, and an attachment, and configured to be operated by an actuator through the operating device,
   wherein the object detecting device is configured to detect an object in a detection space set around the shovel, and
   wherein the control device is configured to determine whether the driven bodies are operating through the operating device, vary, upon determining that at least one of the driven bodies is operating, a size of a movable range being a range accessible to the at least one of the driven bodies, based on a state of the detected object, and prohibit, upon determining that at least one of the driven bodies is not operating, operation of the at least one of the driven bodies based on the state of the detected object.

2. The shovel according to claim 1, wherein information about the state of the object detected by the object detecting device includes information about a change in a location of the object and includes information about a change in a pose of the object.

3. The shovel according to claim 1, wherein the control device is configured to determine whether the object present in the detection space and out of a workspace included in the detection space is likely to enter the workspace, based on an output of the object detecting device over a previously predetermined period.

4. The shovel according to claim 1, wherein the control device is configured to acquire information about the state of the object in the detection space, via at least one from among the object detecting device, and a communication device that controls communication with the object in the detection space.

5. The shovel according to claim 1, wherein the control device is configured to receive information about operational content for the object in the detection space, via a communication device.

6. The shovel according to claim 1, wherein the control device is configured to receive, via a communication device, information about a change in a location of the object in the detection space; and information about a change in a pose of the object in the detection space.

7. The shovel according to claim 1, wherein the control device is configured to receive information about a change in a location of the object in the detection space, via a communication device.

8. The shovel according to claim 1, wherein the control device is configured to transmit, to a management device, information about a change in a location of the shovel; and information about a change in a pose of the shovel.

9. The shovel according to claim 1, wherein the control device is configured to detect a change in the state of the detected object, based on an output of the object detecting device, and increase and decrease the size of the movable range, upon detecting the change in the state of the detected object.

10. A shovel comprising:

a lower-part traveling body;

an upper-part swing body rotatably provided above the lower-part traveling body;

an object detecting device provided in the upper-part swing body;

a control device provided in the upper-part swing body;

an operating device coupled to the control device; and driven bodies including the lower-part traveling body, the upper-part swing body, a boom, an arm, and an end attachment, and configured to be operated by an actuator, wherein the object detecting device is configured to detect an object in a detection space set around the shovel, wherein the control device is configured to:

determine whether the driven bodies are operating through the operating device, variably set, upon determining that at least one of the driven bodies is operating, a movable range being a range accessible to the at least one of the driven bodies, based on a state of the object in the detection space to allow movement of the driven body in the movable range, and prohibit, upon determining that at least one of the driven bodies is not operating, movement of the at least one of the driven bodies based on the state of the detected object, and wherein the control device is configured to: variably set the movable range, such that the movable range decreases upon determining that the object in the detection space moves closer to the shovel or is estimated to move closer to the shovel; or variably set the movable range, such that the movable range increases upon determining that the object in the detection space moves away from the shovel or is estimated to move away from the shovel.

11. The shovel according to claim 10, wherein the state of the object in the detection space is a current state or a future state of the object.

12. The shovel according to claim 10, wherein the control device is configured to: monitor movement of the object present in the detection space and out of a workspace included in the detection space; and brake the driven body upon determining that the object is likely to enter the workspace.

13. The shovel according to claim 10, wherein the control device is configured to: monitor movement of the object present in the detection space and out of a workspace included in the detection space; variably set, upon determining that the object is likely to enter the workspace, the movable range based on the state of the object to allow the movement of the driven body in the movable range.

14. The shovel according to claim 10, wherein the driven bodies includes a swing mechanism, and the end attachment includes a bucket.

15. A shovel comprising:

a lower-part traveling body;

an upper-part swing body rotatably provided above the lower-part traveling body;

an object detecting device provided in the upper-part swing body;

a control device provided in the upper-part swing body; and driven bodies including the lower-part traveling body, the upper-part swing body, a boom, an arm, and an attachment, and configured to be operated by an actuator, wherein the object detecting device is configured to detect an object in a detection space set around the shovel, wherein the control device is configured to vary a size of a movable range being a range accessible to at least one of the driven bodies, based on a state of the detected object, and wherein the control device is configured to transmit, to a management device, information about a change in a location of another shovel that is detected as the object in the detection space; and information about a change in a pose of the another shovel that is detected as the object in the detection space.

* * * * *